United States Patent
Inaba et al.

(10) Patent No.: US 8,671,707 B2
(45) Date of Patent: Mar. 18, 2014

(54) HEAT PUMP CYCLE

(75) Inventors: Atsushi Inaba, Okazaki (JP); Satoshi Itoh, Kariya (JP)

(73) Assignee: Denso Corporation, Kariya (JP)

( * ) Notice: Subject to any disclaimer, the term of this patent is extended or adjusted under 35 U.S.C. 154(b) by 175 days.

(21) Appl. No.: 13/450,800

(22) Filed: Apr. 19, 2012

(65) Prior Publication Data

US 2012/0266624 A1  Oct. 25, 2012

(30) Foreign Application Priority Data

Apr. 21, 2011 (JP) ................................. 2011-095052
Nov. 29, 2011 (JP) ................................. 2011-260523

(51) Int. Cl.
*F25B 13/00* (2006.01)
(52) U.S. Cl.
USPC ..................................................... 62/324.6
(58) Field of Classification Search
USPC ............... 62/324.6, 498, 222, 513, 186, 408, 62/196.1
See application file for complete search history.

(56) References Cited

U.S. PATENT DOCUMENTS

| | | | |
|---|---|---|---|
| 5,526,650 A | 6/1996 | Iritani et al. | |
| 5,704,219 A * | 1/1998 | Suzuki et al. | 62/222 |
| 5,752,391 A | 5/1998 | Ozaki et al. | |
| 5,755,379 A * | 5/1998 | Ito | 237/12.3 R |
| 6,904,766 B2 * | 6/2005 | Ito et al. | 62/324.1 |
| 7,752,864 B2 * | 7/2010 | Takegami et al. | 62/324.1 |
| 8,528,359 B2 * | 9/2013 | Lifson et al. | 62/513 |
| 2006/0083626 A1 * | 4/2006 | Manole | 417/245 |
| 2008/0078191 A1 * | 4/2008 | Morishita et al. | 62/126 |
| 2008/0236185 A1 * | 10/2008 | Choi et al. | 62/332 |
| 2009/0205355 A1 * | 8/2009 | Mihara | 62/335 |
| 2010/0251750 A1 * | 10/2010 | Lifson et al. | 62/434 |
| 2010/0263393 A1 * | 10/2010 | Chen et al. | 62/115 |
| 2011/0113808 A1 * | 5/2011 | Ko et al. | 62/324.3 |
| 2011/0138827 A1 * | 6/2011 | Lifson et al. | 62/117 |

FOREIGN PATENT DOCUMENTS

| | | |
|---|---|---|
| JP | 2000-154941 | 6/2000 |
| JP | 2006-118799 | 5/2006 |
| JP | 2008-175432 | 7/2008 |

OTHER PUBLICATIONS

Office Action issued Jul. 30, 2013 in corresponding Japanese Application No. 2011-260523 (with English translation).

* cited by examiner

*Primary Examiner* — Mohammad M Ali
(74) *Attorney, Agent, or Firm* — Harness, Dickey & Pierce, PLC

(57) ABSTRACT

A heat pump cycle includes a compressor having a suction port and a discharge port, a heating heat exchanger which heats air, a gas-liquid separator, and a cooling heat exchanger which cools air upstream of the heating heat exchanger in an air flow direction. The heat pump cycle further includes an intermediate pressure passage which guides gas refrigerant from the gas-liquid separator to the suction port. A variable open-close portion opens the intermediate pressure passage and decompresses the gas refrigerant in the intermediate pressure passage, so that the gas refrigerant is introduced into the suction port when a bypass dehumidifying-heating mode is selected as a dehumidifying-heating mode in which the air having been heated in the heating heat exchanger becomes equal to or higher than air in an air-conditioning target space in temperature.

19 Claims, 16 Drawing Sheets

( COOLING MODE / NORMAL DEHUMIDIFYING-HEATING MODE )

( COOLING MODE / NORMAL DEHUMIDIFYING-HEATING MODE )

( INJECTION DEHUMIDIFYING-HEATING MODE )

(HEATING MODE)

( COOLING MODE )

( FIRST DEHUMIDIFYING-HEATING MODE )

( SECOND DEHUMIDIFYING-HEATING MODE )

( THIRD DEHUMIDIFYING-HEATING MODE )

( FOURTH DEHUMIDIFYING-HEATING MODE )

( INJECTION DEHUMIDIFYING-HEATING MODE )

( HEATING MODE )

( BYPASS DEHUMIDIFYING-HEATING MODE )

( BYPASS DEHUMIDIFYING-HEATING MODE )

(HEATING MODE)

( BYPASS DEHUMIDIFYING-HEATING MODE )

HEAT PUMP CYCLE

CROSS REFERENCE TO RELATED APPLICATION

This application is based on and incorporates herein by reference Japanese Patent Applications No. 2011-095052 filed on Apr. 21, 2011 and No. 2011-260523 filed on Nov. 29, 2011.

TECHNICAL FIELD

The present disclosure relates to a heat pump cycle, which can be suitably used for a refrigerant cycle device for a vehicle, for example.

BACKGROUND

Conventionally, Patent Document 1 (JP 333176582 corresponding to U.S. Pat. No. 5,526,650) discloses regarding a heat pump cycle (vapor-compressing refrigerant cycle) used for a vehicle air conditioner. The heat pump cycle includes an interior condenser (heating heat exchanger) in which high-temperature and high-pressure refrigerant discharged from a compressor radiates heat via heat exchange with air, an exterior heat exchanger in which the refrigerant having passed through the interior condenser exchanges heat with outside air, and an interior evaporator (cooling heat exchanger) in which the refrigerant flowing out of the exterior heat exchanger evaporates via heat exchange with air. The interior condenser is arranged downstream of the interior evaporator in a flow direction of air to be blown into a vehicle compartment which is a space to be air-conditioned. The blown air having been cooled and dehumidified by a heat absorption effect due to evaporation of refrigerant in the interior evaporator is reheated by utilizing the refrigerant discharged from the compressor as a heat source in the interior condenser, so that dehumidifying-heating of the vehicle compartment is performed.

The heat pump cycle further includes a high-pressure side expansion device which decompresses refrigerant flowing out of the interior condenser and discharges the decompressed refrigerant to the exterior heat exchanger, and a low-pressure side expansion device which decompresses refrigerant flowing out of the exterior heat exchanger and discharges the decompressed refrigerant to the interior evaporator, so as to improve air heating capacity of the interior condenser.

Generally, in such a heat pump cycle, a refrigerant evaporation temperature in the interior evaporator is required to be maintained equal to or higher than a predetermined temperature (e.g. 1° C.), which is higher than a frost-formation temperature (i.e., 0° C.), in order to prevent frost formation on the interior evaporator.

Hence, in the heat pump cycle described in Patent Document 1, when a valve open degree of the high-pressure side expansion device becomes smallest, and when a valve open degree of the low-pressure side expansion device becomes largest, both the exterior heat exchanger and the interior evaporator are used as evaporators in which refrigerant evaporates approximately at the same pressure. In this case, refrigerant evaporation temperatures in the exterior heat exchanger and the interior evaporator are kept at predetermined temperatures.

As a result, heat absorption amounts of refrigerant in both the exterior heat exchanger and the interior evaporator cannot be increased any more. Therefore, if the interior condenser is further required to heat air, it may be impossible to increase the air heating capacity of the interior condenser sufficiently.

SUMMARY

It is an object of the present disclosure to provide a heat pump cycle, which can sufficiently improve air heating capacity.

According to an aspect of the present disclosure, a heat pump cycle includes a compressor, a heating heat exchanger, a first expansion device, a gas-liquid separation portion, a second expansion device, an exterior heat exchanger, a third expansion device, a cooling heat exchanger, an intermediate pressure passage, an open-close portion and a fourth expansion device. The compressor is configured to compress refrigerant, and the compressor has a suction port, through which refrigerant is drawn to be compressed, and a discharge port, from which the compressed refrigerant is discharged. The heating heat exchanger is configured to heat air, which is blown toward an air-conditioning target space, by heat exchange with the refrigerant discharged from the discharge port of the compressor. The first expansion device is configured to decompress the refrigerant flowing out of the heating heat exchanger. The gas-liquid separation portion is configured to separate the refrigerant flowing out of the first expansion device into gas refrigerant and liquid refrigerant. The second expansion device is configured to decompress the liquid refrigerant separated in the gas-liquid separation portion, and the refrigerant flowing out of the second expansion device exchanges heat with outside air in the exterior heat exchanger. The third expansion device is configured to decompress the refrigerant flowing out of the exterior heat exchanger. The cooling heat exchanger is arranged upstream of the heating heat exchanger in a flow direction of the blown air, and the cooling heat exchanger is configured to cool the blown air by heat exchange between the blown air and the refrigerant flowing out of the third expansion device and to let the refrigerant flow to the suction port. The intermediate pressure passage is configured to guide the gas refrigerant from the gas-liquid separation portion to the suction port. The open-close portion is configured to open or close the intermediate pressure passage, and the fourth expansion device is configured to decompress the gas refrigerant flowing in the intermediate pressure passage. The open-close portion and the fourth expansion device are provided to select a bypass dehumidifying-heating mode as a dehumidifying-heating mode in which the blown air having been cooled in the cooling heat exchanger is heated in the heating heat exchanger to be equal to or higher than air in the air-conditioning target space in temperature. The open-close valve opens the intermediate pressure passage such that the gas refrigerant flowing out of the gas-liquid separation portion is decompressed by the fourth expansion device and is introduced into the suction port of the compressor, in the bypass dehumidifying-heating mode.

According to another aspect of the present disclosure, a heat pump cycle includes a compressor, a heating heat exchanger, a first expansion device, a gas-liquid separation portion, a second expansion device, an exterior heat exchanger, a third expansion device, a cooling heat exchanger, an intermediate pressure passage and an open-close portion. The compressor is configured to compress refrigerant, and the compressor has a suction port through which refrigerant is drawn to be compressed, a discharge port from which the compressed refrigerant is discharged, and an intermediate pressure port through which refrigerant is drawn to be compressed. The heating heat exchanger is configured to heat air, which is blown toward an air-conditioning target space, by heat exchange with the refrigerant discharged from the discharge port of the compressor. The first expansion device is configured to decompress the refrigerant flowing out of the heating heat exchanger. The gas-liquid separation portion is configured to separate the refrigerant flowing out of the first expansion device into gas refrigerant and liquid refrigerant. The second expansion device is configured to decompress the liquid refrigerant separated in the gas-liquid separation portion, and the refrigerant flowing out of the second expansion device exchanges heat with outside air in the exterior heat exchanger. The third expansion device is configured to decompress the refrigerant flowing out of the exterior heat exchanger. The cooling heat exchanger is arranged upstream of the heating heat exchanger in a flow direction of the blown air, and the cooling heat exchanger is configured to cool the blown air by heat exchange between the blown air and the refrigerant flowing out of the third expansion device and to let the refrigerant flow to the suction port. The intermediate pressure passage is configured to guide the gas refrigerant from the gas-liquid separation portion to the intermediate pressure port. The open-close portion is configured to open or close the intermediate pressure passage. The open-close portion is provided to select an injection dehumidifying-heating mode as a dehumidifying-heating mode in which the blown air having been cooled in the cooling heat exchanger is heated in the heating heat exchanger to be equal to or higher than air in the air-conditioning target space in temperature. The open-close valve opens the intermediate pressure passage such that the gas refrigerant flowing out of the gas-liquid separation portion is introduced into the intermediate pressure port of the compressor, in the injection dehumidifying-heating mode.

Because the bypass dehumidifying-heating mode or the injection dehumidifying-heating mode can be selected as the dehumidifying-heating mode, the air heating capacity of the heating heat exchanger can be improved sufficiently.

In both the bypass dehumidifying-heating mode and the injection dehumidifying-heating mode, because the open-close portion opens the intermediate pressure passage, the refrigerant circuit of the heat pump cycle may be configured such that the refrigerant flowing out of the heating heat exchanger flows through the first expansion device→the gas-liquid separation portion the second expansion device→the exterior heat exchanger→the third expansion device→the cooling heat exchanger, in this order. Additionally, the refrigerant circuit of the heat pump cycle may be configured such that the gas refrigerant separated in the gas-liquid separation portion flows into the intermediate pressure passage to be decompressed in the fourth expansion device and to be drawn into the suction port in the bypass dehumidifying-heating mode, and such that the gas refrigerant separated in the gas-liquid separation portion flows into the intermediate pressure passage to be drawn into the intermediate pressure port in the injection dehumidifying-heating mode.

In the bypass dehumidifying-heating mode, the refrigerant circuit of the heat pump cycle may be configured as a whole to be the gas bypass cycle, in which intermediate pressure refrigerant in the heat pump cycle is drawn into the compressor from the suction port. In the injection dehumidifying-heating mode, the refrigerant circuit of the heat pump cycle may be configured as a whole to be the gas injection cycle (economizer refrigerant cycle) in which refrigerant may be compressed in two stages including a lower pressure side stage and a higher pressure side stage. Here, the lower pressure side stage is from the suction port to the intermediate pressure port in the compressor, and the higher pressure side stage is from the intermediate pressure port to the discharge port in the compressor. Accordingly, the refrigerant amount drawn into the compressor may be increased, and the compression work amount in the compressor may be thereby improved in both the bypass dehumidifying-heating mode and the injection dehumidifying-heating mode. As a result, the air heating capacity of the heating heat exchanger may be enhanced sufficiently.

The open-close portion does not only mean an open-close valve having a function to open or close the intermediate pressure passage, but also means a flow rate adjusting valve having a function to adjust a flow rate of refrigerant flowing through the intermediate pressure passage in addition to the function to open or close the intermediate pressure passage, by adjusting an open degree of the open-close portion.

The open-close portion may close the intermediate pressure passage such that the refrigerant flowing out of the first expansion device flows totally to the second expansion device when the normal dehumidifying-heating mode is selected as the dehumidifying-heating mode.

In this case, in the normal dehumidifying-heating mode, the refrigerant circuit of the heat pump cycle may be configured such that the refrigerant flowing out of the heating heat exchanger flows through the first expansion device→the gas-liquid separation portion→the exterior heat exchanger→the third expansion device→the cooling heat exchanger, in this order. Accordingly, dehumidifying-heating of the air-conditioning target space may be performed.

The refrigerant flowing to the suction port through the intermediate pressure passage may be increased in flow amount in accordance with increase of the target temperature of the blown air, in the bypass dehumidifying-heating mode. In also the injection dehumidifying-hating mode, the refrigerant flowing to the intermediate pressure port through the intermediate pressure passage may be increased in flow amount in accordance with increase of the target temperature of the blown air.

In this case, the compression work amount in the compressor in the bypass dehumidifying-heating mode and the compression work amount in the higher pressure side stage of the compressor in the injection dehumidifying-heating mode may be improved in accordance with the increase of the target temperature of air blown toward the air-conditioning target space, and the air heating capacity of the heating heat exchanger may be improved sufficiently and properly.

More specifically, a throttle open degree of the first expansion device may be increased in accordance with the increase of the target temperature of the blown air, in the bypass dehumidifying-heating mode. In also the injection dehumidifying-heating mode, a refrigerant amount flowing into the intermediate pressure port may be increased by increase of the throttle open degree in the first expansion device in accordance with the increase of the target temperature of the blown air.

The first expansion device may increase the pressure reducing amount of refrigerant, and the third expansion device may decrease the pressure reducing amount of refrigerant, in accordance with increase of the target temperature of the blown air, in the normal dehumidifying-heating mode.

In this case, in the normal dehumidifying-heating mode, the exterior heat exchanger may be switched from a state (radiator), in which refrigerant flowing in the exterior heat exchanger radiates heat, to a state (evaporator), in which refrigerant flowing in the exterior heat exchanger evaporates, in accordance with the increase of the target temperature of the blown air. Therefore, a heat radiation amount of refrigerant in the heating heat exchanger may be increased, and the air heating capacity of the heating heat exchanger may be thereby improved.

The bypass dehumidifying-heating mode may be selected when the pressure reducing amount of refrigerant in the third expansion device is a smallest amount during the normal dehumidifying-heating mode. The injection dehumidifying-heating mode also may be selected when the pressure reducing amount of refrigerant in the third expansion device is a smallest amount during the normal dehumidifying-heating mode.

When the air heating capacity of the heating heat exchanger is insufficient, the air heating capacity of the heating heat exchanger may be improved sufficiently, by switching the normal dehumidifying-heating mode to the bypass dehumidifying-heating mode or the injection dehumidifying-heating mode.

The smallest amount of the pressure reducing amount of refrigerant in the third expansion device means not only that the third expansion device decompresses refrigerant, but also means that the third expansion device is fully open and does not decompress refrigerant.

The heat pump cycle may include a refrigerant circuit switching portion configured to switch a flow passage of the refrigerant. When the cooling mode, in which the blown air is cooled to be lower than the air in the air-conditioning target space in temperature, is selected instead of the dehumidifying-heating mode, the open-close portion may close the intermediate pressure passage. Additionally, the refrigerant circuit switching portion may cause the refrigerant flowing out of the heating heat exchanger to flow through, in this order, the first expansion device, the gas-liquid separation portion, the exterior heat exchanger, the third expansion device, the cooling heat exchanger and the compressor.

Accordingly, the heat pump cycle may include the refrigerant circuit changing portion in addition to the open-close portion. Therefore, the cooling mode, in which the blown air is cooled, may be performed.

When the heating mode, in which the blown air is heated to be equal to or higher than the air in the air-conditioning target space in temperature, is selected instead of the dehumidifying-heating mode or the cooling mode, the open-close portion may close the intermediate pressure passage. Moreover, the refrigerant circuit switching portion may cause the refrigerant flowing out of the heating heat exchanger to flow through, in this order, the first expansion device, the gas-liquid separation portion, the second expansion device, the exterior heat exchanger and the compressor.

Because the refrigerant circuit of the heat pump cycle may be selected as described above, the heating mode, in which the blown air is heated, may be performed.

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Figure 1:
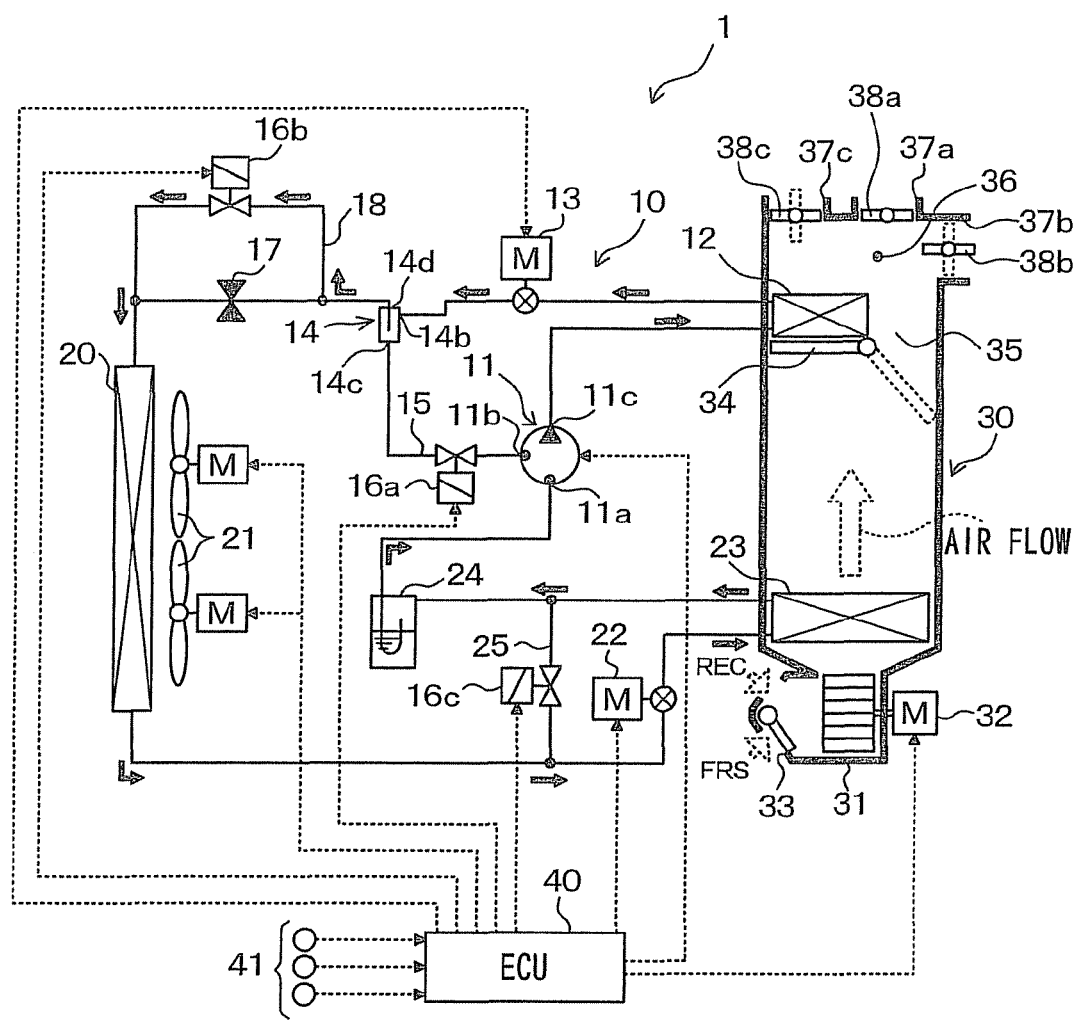
FIG. 1 is a schematic diagram showing a refrigerant circuit of a heat pump cycle for a vehicle air conditioner in a cooling mode and in a normal dehumidifying-heating mode, according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 15. In the first embodiment, a refrigerant cycle device of the present disclosure is used for a vehicle air conditioner 1 of an electrical vehicle in which driving force is obtained from an electrical motor for vehicle running. In the vehicle air conditioner 1, the refrigerant cycle device functions to heat or cool air to be blown into a vehicle compartment that is an example of a space (air-conditioning target space) to be air-conditioned. Therefore, a fluid to be heat-exchanged with refrigerant in the present embodiment is the blown air.

Figure 2:
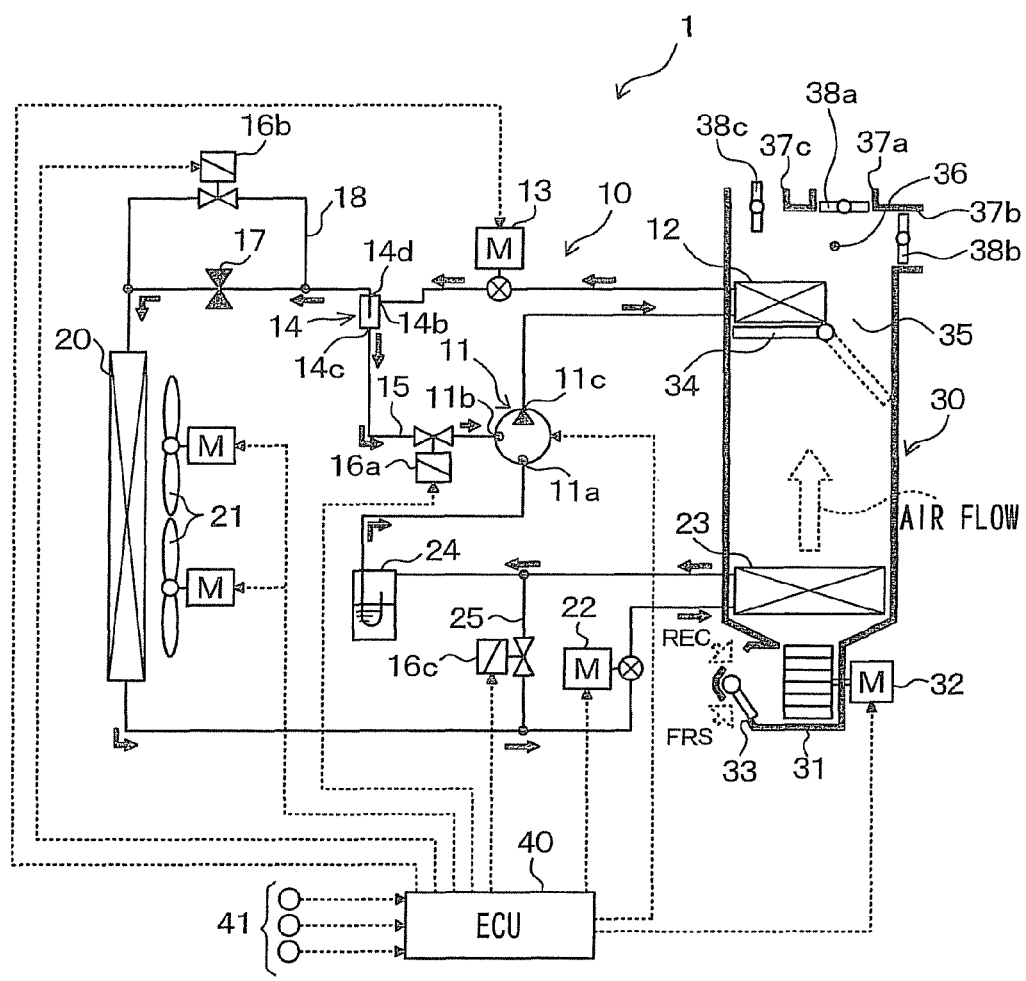
FIG. 2 is a schematic diagram showing a refrigerant circuit of the heat pump cycle for the vehicle air conditioner in an injection dehumidifying-heating mode, according to the first embodiment.
Figure 3:
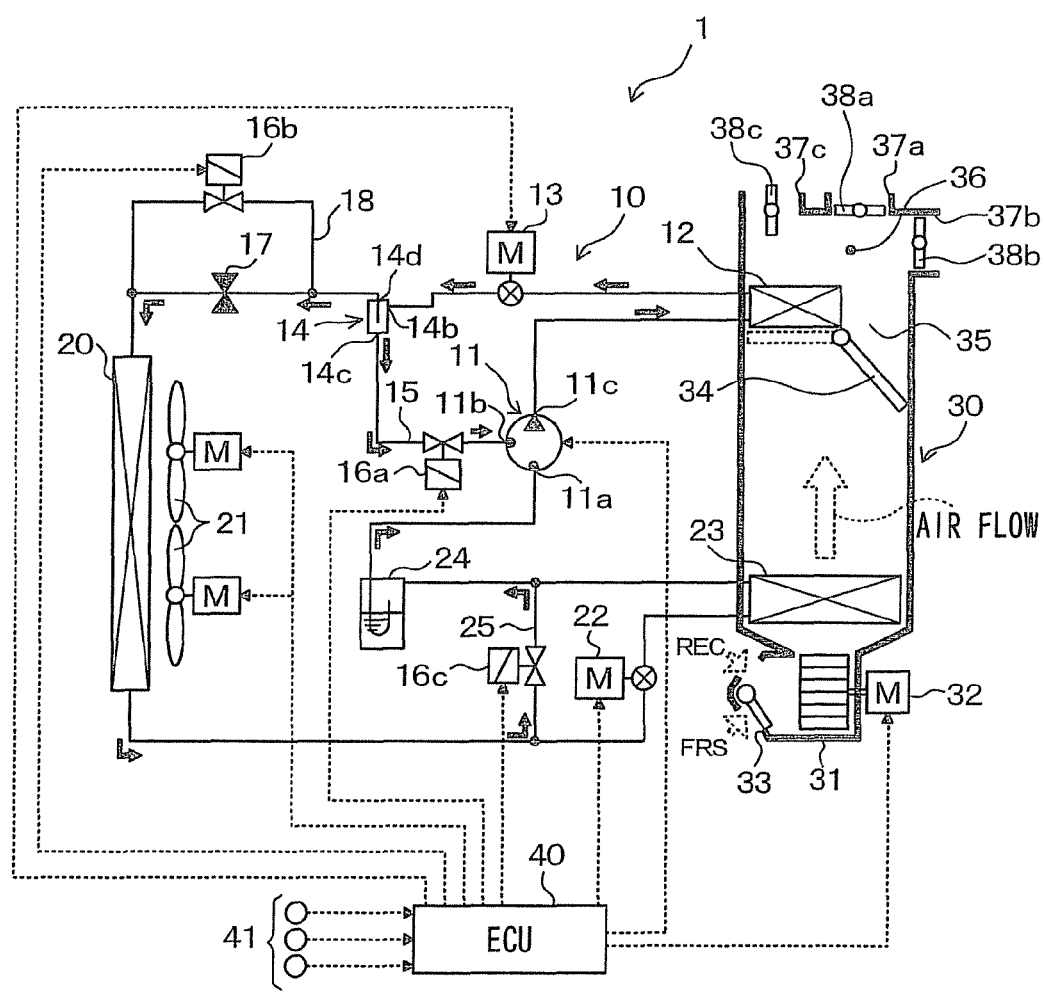
FIG. 3 is a schematic diagram showing a refrigerant circuit of the heat pump cycle for the vehicle air conditioner in a heating mode, according to the first embodiment.

The refrigerant cycle device includes a heat pump cycle 10 (vapor-compressing refrigerant cycle) that is capable of switching its refrigerant circuit depending on an air conditioning mode including a cooing mode, a heating mode, a normal dehumidifying-heating mode and an injection dehumidifying-heating mode. In the cooling mode, a refrigerant circuit shown in FIG. 1 is selected, and the blown air is cooled so that the vehicle compartment is cooled. Also in the normal dehumidifying-heating mode, the refrigerant circuit shown in FIG. 1 is selected, and the vehicle compartment is dehumidified and heated. In the injection dehumidifying-heating mode, a refrigerant circuit shown in FIG. 2 is selected, and the vehicle compartment is dehumidified and heated. Here, air heating capacity in the injection dehumidifying-heating mode is increased as compared to in the normal dehumidifying-heating mode. In the heating mode, a refrigerant circuit shown in FIG. 3 is selected, and the blown air is heated so that the vehicle compartment is heated.

A hydrofluorocarbon (HFC) refrigerant (e.g., R-134a) is adopted as refrigerant used for the heat pump cycle 10, and the heat pump cycle 10 is a vapor-compressing subcritical refrigerant cycle. Thus, a pressure Pd having a highest pressure in the heat pump cycle 10 is lower than a critical pressure of the refrigerant. Alternatively, a hydrofluoro-olefine (HFO) refrigerant (e.g., R1234yf) may be adopted as the refrigerant, for example. The refrigerant contains oil to lubricate a compressor 11 of the heat pump cycle 10, and a part of the oil circulates together with the refrigerant in the heat pump cycle 10.

The compressor 11 of the heat pump cycle 10 is arranged inside a hood of the vehicle, and draws and compresses refrigerant to discharge the compressed refrigerant. For example, the compressor 11 is an electrical two-stage compressor including a housing used as an outer shell of the compressor 11, higher-stage and lower-stage fixed displacement compression mechanisms accommodated inside the housing, an electrical motor accommodated inside the housing to rotationally drive the two compression mechanisms. Refrigerant is compressed at higher pressure in the higher-stage compression mechanism than in the lower-stage compression mechanism.

The housing of the compressor 11 has a suction port 11a through which low pressure refrigerant is drawn into the lower-stage compression mechanism from outside the housing, an intermediate pressure port 11b through which intermediate pressure refrigerant is drawn into the housing to be mixed with refrigerant flowing from the lower-stage compression mechanism to the higher-stage compression mechanism, and a discharge port 11c through which high pressure refrigerant is discharged from the higher-stage compression mechanism to outside the housing.

More specifically, the intermediate pressure port 11b is connected to a refrigerant discharge side of the lower-stage compression mechanism, in other words, the intermediate pressure port 11b is connected to a refrigerant suction side of the higher-stage compression mechanism. Various types of compression mechanisms, such as a scroll-type compression mechanism, a vane-type compression mechanism, and a rolling piston-type compression mechanism, may be adopted as the lower-stage and the higher-stage compression mechanism.

An operation (rotation rate) of the electrical motor of the compressor 11 is controlled by a control signal outputted from an air conditioner controller 40 (A/C ECU), and an alternating-current motor or a direct-current motor may be adopted as the electrical motor. By the control of the rotation rate of the electrical motor, a refrigerant discharge capacity of the compressor 11 is controlled. Thus, in the present embodiment, the electrical motor is used as an example of a discharge capacity changing portion of the compressor 11 which changes the refrigerant discharge capacity of the compressor 11.

The compressor 11 includes the two compression mechanisms accommodated in the single housing of the compressor 11 in the present embodiment, but a configuration of the compressor 11 is not limited to this. Alternatively, the compressor 11 may accommodate a single compression mechanism and an electrical motor rotationally driving the single compression mechanism if intermediate pressure refrigerant can be drawn into the compressor 11 to be mixed with refrigerant being in a compression process of the compressor 11.

Moreover, two compressors: higher-stage and lower-stage compressors may be arranged separately in series instead of the above-described configuration of the compressor 11, and the two compressors may be adopted as the single two-stage compressor 11. In this case, a suction port of the lower-stage compressor may be adopted as the suction port 11a, and a discharge port of the higher-stage compressor may be adopted as the discharge port 11c. The intermediate pressure port 11b may be provided in a part connecting between a discharge port of the lower-stage compressor and a suction port of the higher-stage compressor.

As shown in FIGS. 1 to 3, the discharge port 11c of the compressor 11 is connected to a refrigerant inlet side of an interior condenser 12. The interior condenser 12 is arranged inside a casing 31 (air conditioning case) of an interior air conditioning unit 30 of the vehicle air conditioner 1 to function as a radiator in which high-temperature and high-pressure refrigerant discharged from the higher-stage compression mechanism of the compressor 11 radiates heat. The interior condenser 12 is used as an example of a heating heat exchanger (using side heat exchanger) which heats air having passed through an interior evaporator 23 described later.

A refrigerant outlet side of the interior condenser 12 is connected to an inlet of a first expansion valve 13 (higher stage expansion valve) used as an example of a first expansion device (higher stage expansion device). The first expansion device (13) decompresses high pressure refrigerant flowing out of the interior condenser 12 so that the high pressure refrigerant changes into intermediate pressure refrigerant. The first expansion valve 13 is an electrical variable throttle mechanism, that includes a valve body in which an open degree of the valve body is changeable, and an electrical actuator having a step motor which changes the open degree of the valve body.

When the first expansion valve 13 is set into a decompression state in which the first expansion valve 13 decompresses refrigerant, an open degree of the first expansion valve 13 is regulated within a range from φ0.5 mm to φ3 mm in cross-section diameter. When the first expansion valve 13 is fully open, the open degree is set to be around φ10 mm in cross-section diameter. The first expansion valve 13 in the full open state does not decompress refrigerant. An operation of the first expansion valve 13 is controlled by a control signal outputted from the air conditioning controller 40.

An outlet side of the first expansion valve 13 is connected to an inflow port 14b of a gas-liquid separator 14. The gas-liquid separator 14 is used as an example of a gas-liquid separation portion which separates intermediate pressure refrigerant into gas refrigerant and liquid refrigerant. Here, the intermediate pressure refrigerant has passed through the interior condenser 12 and been compressed in the first expansion valve 13. The gas-liquid separator 14 is a centrifugal separator which separates refrigerant into gas and liquid by utilizing centrifugal force.

Figure 4A:
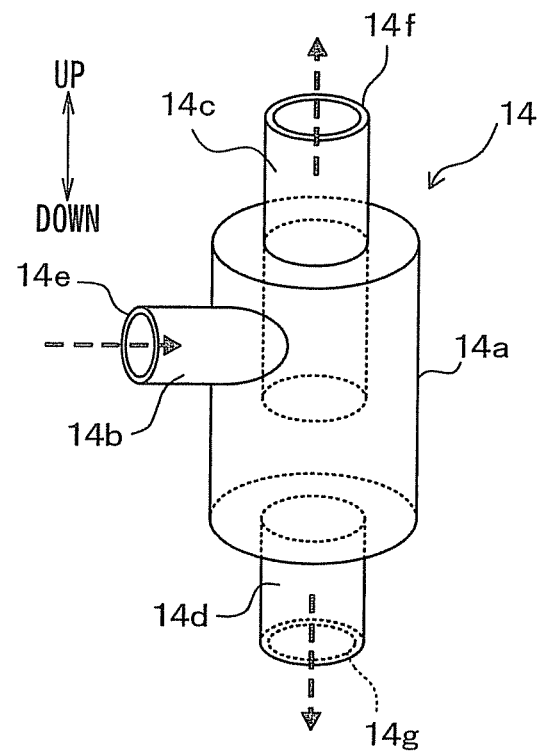
FIG. 4A is a schematic perspective view showing a gas-liquid separator of the heat pump cycle of the vehicle air conditioner according to the first embodiment.
Figure 4B:
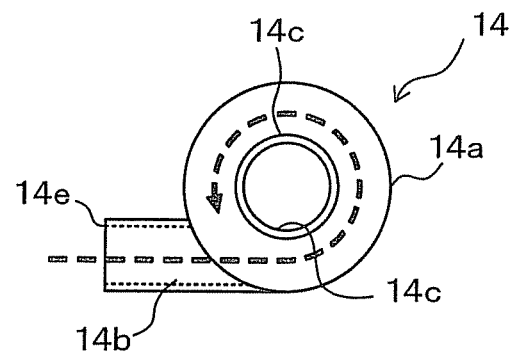
FIG. 4B is a schematic top view showing the gas-liquid separator of the heat pump cycle of the vehicle air conditioner according to the first embodiment.

A detailed configuration of the gas-liquid separator 14 will be described referring to FIGS. 4A and 4B. The up-down arrow shown in FIG. 4A indicates a vertical direction when the gas-liquid separator 14 is attached in the vehicle air conditioner 1.

The gas-liquid separator 14 of the present embodiment includes a main body part 14a having a hollow and almost cylindrically bottomed shape and extending in the vertical direction, the inflow port 14b having an inflow opening 14e through which intermediate pressure refrigerant is introduced into the main body part 14a, a gas outflow port 14c having a gas outflow opening 14f through which gas refrigerant flows out of the main body part 14a, and a liquid outflow port 14d having a liquid outflow opening 14g through which liquid refrigerant flows out of the main body part 14a.

A diameter of the main body part 14a is set at a value from one and half times to three times as large as diameters of refrigerant pipes connected to the ports 14b to 14d. Accordingly, miniaturization of the gas-liquid separator 14 is provided.

A volume of the main body part 14a of the gas-liquid separator 14 is set to be smaller than a surplus refrigerant volume that is obtained by subtracting a necessary refrigerant volume from a sealed total refrigerant volume. Here, the sealed total refrigerant volume is obtained by converting a total volume of gas and liquid refrigerant enclosed in the heat pump cycle 10 to a liquid refrigerant volume, and the necessary refrigerant volume is obtained by converting a necessary volume of refrigerant for optimizing performance of the heat pump cycle 10 to a liquid refrigerant volume. In other words, the volume of the gas-liquid separator 14 of the present embodiment is set such that the gas-liquid separator 14 cannot store surplus refrigerant therein substantially, even when a flow rate of refrigerant circulating in the heat pump cycle 10 is changed due to load variation of the heat pump cycle 10.

The inflow port 14b is connected to a lateral surface of the cylindrical main body part 14a. As shown in FIG. 4A, the inflow port 14b extends in a tangential direction of a cross-sectional circle of the main body part 14a when viewed from above the gas-liquid separator 14. The inflow port 14b has the inflow opening 14e at an end of the inflow port 14b opposite from the main body part 14a. The inflow port 14b may not necessarily extend in a horizontal direction, and may extend at some angle with respect to the horizontal direction.

The gas outflow port 14c is connected to the main body part 14a at an upper end surface (top surface) of the main body part 14a in an axial direction of the main body part 14a, and the gas outflow port 14c extends through the top surface of the main body part 14a coaxially with the main body part 14a. The gas outflow port 14c has the gas outflow opening 14f at an upper end part of the gas outflow port 14c, and a lower end part of the gas outflow port 14c is located downward of a connection part between the main body part 14a and the gas outflow port 14c.

The liquid outflow port 14d is connected to the main body part 14a at a lower end surface (bottom surface) of the main body part 14a in its axial direction, and the liquid outflow port 14d extends downward from the bottom surface of the main body part 14a coaxially with the main body part 14a. A lower end part of the liquid outflow port 14d has the liquid outflow opening 14g.

Refrigerant flowing into the gas-liquid separator 14 from the inflow opening 14e of the inflow port 14b flows and swirls along a cylindrical inner surface of the main body part 14a, and the refrigerant is separated into gas refrigerant and liquid refrigerant by utilizing centrifugal force caused by the swirl flow. Subsequently, the liquid refrigerant obtained by this separation falls down in the main body part 14a by gravity.

The dropped liquid refrigerant flows out of the liquid outflow opening 14g of the liquid outflow port 14d, and the gas refrigerant obtained by the separation flows out of the gas outflow opening 14f of the gas outflow port 14c. In FIGS. 4A and 4B, the lower end surface (bottom surface) of the main body part 14a has a circular shape. The main body part 14a may be formed into a tapered shape in which a diameter of the main body part 14a is gradually reduced downward, and a lowest part of the tapered main body part 14a may be connected to the liquid outflow port 14d.

As shown in FIGS. 1 to 3, the liquid outflow port 14c of the gas-liquid separator 14 is coupled to the intermediate pressure port 11b of the compressor 11 via an intermediate pressure passage 15. A first open-close valve 16a (intermediate pressure-side open-close valve) is arranged in the intermediate pressure passage 15, and the first open-close valve 16a is an electromagnetic valve used as an example of an open-close portion which opens or closes the intermediate pressure passage 15. An operation of the first open-close valve 16a is controlled by a control signal outputted from the air conditioning controller 40.

The first open-close valve 16a is used also as a check valve which allows refrigerant only to flow from the gas outflow port 14c of the gas-liquid separator 14 to the intermediate pressure port 11b of the compressor 11 when the intermediate passage 15 is open. Accordingly, when the first open-close valve 16a opens the intermediate passage 15, refrigerant is prevented from flowing back from the compressor 11 to the gas-liquid separator 14.

Moreover, the first open-close valve 16a functions also to switch the refrigerant circuit of the heat pump cycle 10 by opening or closing the intermediate pressure passage 15. Thus, the first open-close valve 16a in the present embodiment is used also as an example of a refrigerant circuit switching portion which switches the refrigerant circuit of the heat pump cycle 10.

The liquid outflow port 14d of the gas-liquid separator 14 is connected to an inlet side of a fixed throttle 17 (lower stage fixed throttle), and an outlet side of the fixed throttle 17 is connected to a refrigerant inlet side of an exterior heat exchanger 20. The fixed throttle 17 is used as an example of a second expansion device (lower stage expansion device) which decompresses liquid refrigerant flowing out of the gas-liquid separator 14 such that the liquid refrigerant low pressure refrigerant. A nozzle having a fixed open degree or an orifice can be adopted as the fixed throttle 17, for example.

In the fixed throttle 17 such as the nozzle or the orifice, a passage cross-section is drastically decreased or drastically increased. Thus, a flow rate of refrigerant flowing through the fixed throttle 17 and a quality X of refrigerant upstream of the fixed throttle 17 can be self-adjusted (balanced) depending on a pressure difference between the upstream (inlet) side and a downstream (outlet) side of the fixed throttle 17.

Specifically, when the pressure difference is relatively high, the quality X of refrigerant upstream of the fixed throttle 17 is balanced to be increased in accordance with decrease of a necessary flow amount of refrigerant circulating in the heat pump cycle 10. On the other hand, when the pressure difference is relatively low, the quality X of refrigerant upstream of the fixed throttle 17 is balanced to be decreased in accordance with increase of the necessary flow amount of refrigerant circulating in the heat pump cycle 10.

When the quality X of refrigerant upstream of the fixed throttle 17 is high, and when the exterior heat exchanger 20 is used as an evaporator in which refrigerant exerts its heat absorption effect, a heat absorption amount (refrigeration capacity) in the exterior heat exchanger 20 may decrease, and a coefficient of performance (COP) of the heat pump cycle 10 may thereby decrease.

Thus, in the present embodiment, the fixed throttle 17 is configured such that the quality X of refrigerant upstream of the fixed throttle 17 is always set to be equal to or lower than 0.1 regardless of change of the necessary flow amount of refrigerant circulating in the heat pump cycle 10 due to the load variation of the heat pump cycle 10 in the heating mode. That is, even when a refrigerant circulation rate Q and the pressure difference between the inlet side and the outlet side of the fixed throttle 17 are changed within a desired range due to the load variation of the heat pump cycle 10, the quality X of refrigerant upstream of the fixed throttle 17 is adjusted to be equal to or lower than 0.1. As a result, the COP of the heat pump cycle 10 is prevented from decreasing.

The liquid outflow port 14d of the gas-liquid separator 14 is further connected to a bypass passage 18 through which liquid refrigerant flowing out of the gas-liquid separator 14 bypasses the fixed throttle 17 and is guided toward the exterior heat exchanger 20. A second open-close valve 16b (low pressure-side open-close valve) is provided in the bypass passage 18. The second open-close valve 16b is an electro-magnetic valve, in which its basic structure is equivalent to a basic structure of the first open-close valve 16a. An operation of the second open-close valve 16b is controlled by control signal outputted from the air conditioner controller 40.

A pressure loss generated when refrigerant flows through the second open-close valve 16b is extremely lower than a pressure loss generated when refrigerant flows through the fixed throttle 17. Hence, when the second open-close valve 16b is open, refrigerant from the interior condenser 12 flows into the exterior heat exchanger 20 via the bypass passage 18. In contrast, when the second open-close valve 16b is closed, refrigerant from the interior condenser 12 flows into the exterior heat exchanger 20 via the fixed throttle 17.

The second open-close valve 16b can cause the refrigerant circuit of the heat pump cycle 10 to be switched. Thus, the second open-close valve 16b of the present embodiment is used as an example of the refrigerant circuit switching portion together with the first open-close valve 16a.

An electrical three-way valve may be used as the refrigerant circuit switching portion 16b, which switches between a refrigerant circuit connecting an outlet side of the liquid outflow port 14d of the gas-liquid separator 14 to the inlet side of the fixed throttle 17 and a refrigerant circuit connecting the outlet side of the liquid outflow port 14d of the gas-liquid separator 14 to an inlet side of the bypass passage 18.

The exterior heat exchanger 20 is arranged in the hood of the vehicle, and refrigerant flowing through the exterior heat exchanger 20 exchanges heat with outside air blown by a blower fan 21. The exterior heat exchanger 20 functions as an evaporator in which low pressure refrigerant evaporates and exerts its heat absorption effect, at least in the heating mode, and functions also as a radiator in which high pressure refrigerant radiates heat, in the cooling mode or the like.

A refrigerant outlet side of the exterior heat exchanger 20 is connected to a refrigerant inlet side of a second expansion valve 22 (cooling expansion valve) used as an example of a third expansion device which decompresses refrigerant flowing from the exterior heat exchanger 20 into the interior evaporator 23 in the cooling mode. A basic structure of the second expansion valve 22 is similar to that of the first expansion valve 13, and an operation of the second expansion valve 22 is controlled by a control signal outputted from the air conditioning controller 40.

An outlet side of the second expansion valve 22 is connected to a refrigerant inlet side of the interior evaporator 23. The interior evaporator 23 is arranged upstream of the interior condenser 12 in an air flow direction in the casing 31 of the air conditioning unit 30. The interior evaporator 23 is used as an example of an evaporator (cooling heat exchanger) which cools air by utilizing a heat-absorption effect caused by evaporation of refrigerant flowing through the interior evaporator 23 in the cooling mode, the dehumidifying-heating mode or the like.

A refrigerant outlet side of the interior evaporator 23 is connected to an inlet side of an accumulator 24. The accumulator 24 is a low pressure-side gas-liquid separator which separates refrigerant into gas refrigerant and liquid refrigerant and accumulates surplus refrigerant therein. An outlet of the accumulator 24, through which the gas refrigerant flows out of the accumulator 24, is connected to the suction port 11a of the compressor 11. The interior evaporator 23 is connected to the suction port 11a of the compressor 11 via the accumulator 24 such that refrigerant flows from the interior evaporator 23 through the accumulator 24 to the suction port 11a of the compressor 11.

The refrigerant outlet side of the exterior heat exchanger 20 is further connected to a bypass passage 25, through which refrigerant flowing out of the exterior heat exchanger 20 bypasses the second expansion valve 22 and the interior evaporator 23 to be guided toward the inlet side of the accumulator 24. A third open-close valve 16c (cooling open-close valve) is provided in the bypass passage 25 to open or close the bypass passage 25.

A basic structure of the third open-close valve 16c is similar to that of the second open-close valve 16b, and an operation of the third open-close valve 16c is controlled by a control signal outputted from the air conditioning controller 40. A pressure loss generated when refrigerant flows through the third open-close valve 16c is extremely lower than a pressure loss generated when refrigerant flows through the second expansion valve 22.

Hence, when the third open-close valve 16c is open, refrigerant flowing out of the exterior heat exchanger 20 flows into the accumulator 24 via the bypass passage 25. At this time, the second expansion valve 22 may be fully open.

When the third open-close valve 16c is closed, refrigerant flowing out of the exterior heat exchanger 20 flows into the interior evaporator 23 via the second expansion valve 22.

Therefore, the third open-close valve 16c can cause the refrigerant circuit of the heat pump cycle 10 to be switched, and the third open-close valve 16c is used as an example of the refrigerant circuit switching portion together with the first and second open-close valves 16a, 16b.

Next, the air conditioning unit 30 will be described with reference to FIGS. 1 to 3. The air conditioning unit 30 is arranged inside an instrumental panel positioned at a front end part of the vehicle compartment. The air conditioning unit 30 includes the casing 31 which constitutes an outer shell of the air conditioning unit 30 and defines therein an air passage for air that is to be blown into the vehicle compartment. In the air passage, a blower 32, the interior condenser 12 and the interior evaporator 32 are accommodated, for example.

The casing 31 accommodates an inside/outside air switching device 33 at an upstream end part of the casing 31, and the inside/outside air switching device 33 is used for selectively introducing inside air (REC) (i.e. air inside the vehicle compartment) or/and outside air (FRS) into the casing 31. Specifically, the inside/outside air switching device 33 continuously adjusts opening areas of an inside air port, through which inside air is introduced, and an outside air port, through which outside air is introduced, by using an inside/outside air switching door. Accordingly, the inside/outside air switching device 33 continuously changes an air flow ratio between the inside air and the outside air.

The blower 32 is arranged downstream of the inside/outside air switching device 33 in the air flow direction, and the blower 32 blows air drawn via the inside/outside air switching device 33 toward the vehicle compartment. The blower 32 is an electrical blower which drives a centrifugal multi-blade fan (sirocco fan) by using an electrical motor, and a rotation rate (air blowing amount) of the blower 32 is controlled by a control voltage outputted from the air conditioning controller 40.

The interior evaporator 23 and the interior condenser 12 are arranged downstream of the blower 32 in the air flow direction in the order: the interior evaporator 23→the interior condenser 12. In other words, the interior evaporator 23 is arranged upstream of the interior condenser 12 in the air flow direction.

In the casing 31, a bypass air passage 35 is provided through which air having passed through the interior evaporator 23 bypasses the interior condenser 12, and an air mix door 34 is arranged downstream of the interior evaporator 23 and upstream of the interior condenser 12 in the air flow direction.

The air mix door 34 of the present embodiment adjusts an air flow ratio between a flow rate of air passing through the interior condenser 12 and a flow rate of air passing through the bypass air passage 35. Hence, the air mix door 34 is used as an example of a flow rate adjusting portion which adjusts a flow rate (air amount) flowing into the interior condenser 12, and is used also as an example of a heat exchange capacity adjusting portion which adjusts a heat exchange capacity of the interior condenser 12.

A mixing space 36 is provided downstream of the interior condenser 12 and of the bypass air passage 35 in the air flow direction in the casing 31. Heated air, which has exchanged heat with refrigerant in the interior condenser 12, and non-heated air, which has passed through the bypass air passage 35, are mixed in the mixing space 36.

Thus, the air mix door 34 adjusts the air flow ratio between the flow rate of air passing through the interior condenser 12 and the flow rate of air passing through the bypass air passage 35, so that a temperature of air in the mixing space 36 is adjusted. The air mix door 34 is driven by a not-shown servomotor in which its operation is controlled by a control signal outputted from the air conditioning controller 40.

A downstream part of the casing 31 in the air flow direction has openings through which air conditioned in the mixing space 36 is blown out toward the vehicle compartment. The vehicle compartment is the space (air-conditioning target space) to be air-conditioned. For example, the openings are a defroster opening 37a through which conditioned air is blown toward an inner surface of a windshield of the vehicle, a face opening 37b through which conditioned air is blown toward an upper part of a passenger in the vehicle compartment, and a foot openings 37c through which conditioned air is blown toward a foot area of the passenger.

A defroster door 38a, a face door 38b and a foot door 38c are arranged upstream of the defroster opening 37a, the face opening 37b and the foot opening 37c in the air flow direction, respectively. The defroster door 38a, the face door 38b and the foot door 38c adjust opening areas of the defroster opening 37a, the face opening 37b and the foot opening 37c, respectively.

The defroster door 38a, the face door 38b and the foot door 38c open or close the openings 37a, 37b, 37c, respectively, thereby being used as examples of an air outlet mode switching portion which switches an air outlet mode. These three doors 38a, 38b, 38c are driven via a link mechanism or the like by a servomotor in which an operation of the servomotor is controlled by a control signal outputted from the air conditioning controller 40.

Downstream sides of the defroster opening 37a, the face opening 37b and the foot opening 37c in the air flow direction are connected, via air passages of ducts, to a defroster air outlet, a face air outlet and a foot air outlet provided in the vehicle compartment, respectively.

The air outlet mode includes a face mode in which the face opening 37b is fully open such that conditioned air is blown from the face air outlet toward the upper part of the passenger in the vehicle compartment, a bi-level mode in which both the face opening 37b and the foot opening 37c are open such that conditioned air is blown toward the upper part and the foot area of the passenger, and a foot mode in which the foot opening 37c is fully open and the defroster opening 37a is slightly open such that conditioned air is blown mainly from the foot air outlet.

Next, an electrical control portion of the present embodiment will be described. The air conditioning controller 40 includes a known microcomputer and its peripheral circuit, and the microcomputer includes a central processing unit (CPU), a read-only memory (ROM) and a random access memory (RAM). The air conditioning controller 40 performs various calculation and processes based on an air conditioning program stored in the ROM, and controls operations of various air conditioning components (e.g., the compressor 11, the open-close valves 16a, 16b, 16c and the blower 32) connected to an output side of the air conditioning controller 40.

An input side of the air conditioning controller 40 is connected to a sensor group 41 having various air conditioning sensors. The sensor group 41 includes an inside air sensor which detects a temperature inside the vehicle compartment, an outside air sensor which detects a temperature of outside air, a solar radiation sensor which detects a solar radiation amount entering into the vehicle compartment, an evaporator temperature sensor which detects a temperature (temperature of the interior evaporator 23) of air flowing out of the interior evaporator 23, a discharge pressure sensor which detects a pressure of high pressure refrigerant discharged from the compressor 11, a condenser temperature sensor which detects a temperature of refrigerant flowing out of the interior condenser 12, and an inlet pressure sensor which detects a pressure of refrigerant drawn into the compressor 11.

The input side of the air conditioning controller 40 is further connected to a control panel (not shown) disposed in the instrumental panel at the front end part of the vehicle compartment, and control signals from various air conditioning switches provided on the control panel are inputted into the air conditioning controller 40. The various air conditioning switches of the control panel includes an activation switch of the vehicle air conditioner 1, a temperature setting switch used for setting a temperature inside the vehicle compartment, and a mode selecting switch used for selecting one of the cooling mode, the dehumidifying-heating mode and the heating mode.

The air conditioning controller 40 integrally includes control portions (hardware and software) which control operations of the various air conditioning components connected the output side of the air conditioning controller 40.

For example, in the present embodiment, the control portions include a discharge capacity control portion which controls an operation of the electrical motor of the compressor 11, an open-close valve control portion which controls an operation of the first open-close valve 16a, a refrigerant circuit control portion which controls operations of the second and third open-close valves 16b, 16c used as examples of the refrigerant circuit switching portion, and a flow amount control portion which controls the servomotor for the air mix door 34. The discharge capacity control portion, the open-close valve control portion, the refrigerant circuit control portion and the flow amount control portion may be provided separately from the air conditioning controller 40.

Next, an operation of the vehicle air conditioner 1 of the present embodiment will be described in reference to FIGS. 5 to 15. A control process of the operation of the vehicle air conditioner 1 shown in FIG. 5 starts when the activation switch of the vehicle air conditioner 1 is turned ON. Each control step of flowcharts shown in drawings constitutes each of various function execution portions that the air conditioning controller 40 includes.

At step S1, the air conditioning controller 40 performs initializations (initializing process) of a flag, a timer, default positions of various electrical actuators and the like, and then performs a control operation of step S2. In the initializing process of step S1, some of flags and calculation values stored at termination of the last operation of the vehicle air conditioner 1 are maintained.

At step S2, the air conditioning controller 40 reads in, for example, a preset temperature Tset of the vehicle compartment set by the temperature setting switch, an air conditioning mode selected by the mode selecting switch, and then performs a control operation of step S3. At step S3, the air conditioning controller 40 reads in signals of vehicle environmental conditions for performing an air conditioning control, i.e., reads in detection signals from the sensor group 41 for performing the air conditioning control, and then performs a control operation of step S4.

At step S4, the air conditioning controller 40 calculates a target outlet temperature TAO (target temperature) of air to be blown into the vehicle compartment from the air outlets, and then performs a control operation of step S5. Specifically, at step S4, the target outlet temperature TAO of the present embodiment is calculated by using the preset temperature Tset, an inside air temperature Tr of the vehicle compartment detected by the inside air sensor, an outside air temperature Tam detected by the outside air sensor, and a solar radiation amount Ts detected by the solar radiation sensor.

At step S5, the air conditioning controller 40 determines an air blowing capacity (air blowing amount) of the blower 32, and then performs a control operation of step S6. Specifically, at step S5, the air blowing amount (e.g., a blower motor voltage applied to the electrical motor of the blower 32) of the blower 32 is determined by using a control map stored in the air conditioning controller 40 based on the target outlet temperature TAO determined at step S4.

For example, in the present embodiment, when the target outlet temperature TAO is determined within an extremely low temperature range or an extremely high temperature range at step S4, the blower motor voltage is set to be high voltage around a highest value so that the air blowing amount of the blower 32 is controlled to be around a largest air blowing amount. When the target outlet temperature TAO is increased from the extremely low temperature range toward a predetermined middle temperature range, the blower motor voltage is reduced so that the air blowing amount of the blower 32 is reduced in accordance with the increase of the target outlet temperature TAO.

When the target outlet temperature TAO is decreased from the extremely high temperature range toward the middle temperature range, the blower motor voltage is reduced so that the air blowing amount of the blower 32 is reduced in accordance with the decrease of the target outlet temperature TAO. When the TAO is determined to be within the middle temperature range, the blower motor voltage is set to be a lowest value so that the air blowing amount of the blower 32 becomes a smallest amount.

At step S6, the air conditioning controller 40 determines the air conditioning mode based on a control signal from the mode selecting switch of the control panel. When the cooling mode is selected as the air conditioning mode by the mode selecting switch, a control process of step S7 is performed. When the dehumidifying-heating mode is selected as the air conditioning mode, a control process of step S8 is performed. When the heating mode is selected as the air conditioning mode, a control process of step S9 is performed.

At steps S7 to S9, the control processes corresponding to each air conditioning mode are performed, and then a control operation of step S10 is performed. Detailed descriptions of the control processes of steps S7 to S9 will be described later.

At step S10, the air conditioning controller 40 determines a switching condition (air inlet mode) of the inside/outside air switching device 33, and then performs a control operation of step S11. At step S10, the air inlet mode is determined based on the target outlet temperature TAO by using a control map stored in the air conditioning controller 40. In the present embodiment, an outside air mode, in which outside air is mainly introduced into the air conditioning unit 30, is generally determined as the air inlet mode. However, when the target outlet temperature TAO is determined to be within the extremely low temperature range or within the extremely high temperature range, such that, when high cooling performance or high heating performance is required, an inside air mode is selected as the air inlet mode, in which inside air is mainly introduced into the air conditioning unit 30.

At step S11, the air conditioning controller 40 determines the air outlet mode, and then performs a control operation of step S12. At step S11, the air outlet mode is determined based on the target outlet temperature TAO by using a control map stored in the air conditioning controller 40. In the present embodiment, the air outlet mode is switched in an order: the foot mode→the bi-level mode→the face mode, in accordance with change of the target outlet temperature TAO from a high temperature range to a low temperature range.

At step S12, the air conditioning controller 40 outputs control signals and control voltages to the various air conditioning components, which are connected to the output side of the air conditioning controller 40 and are objects to be controlled, such that control states determined at steps S6 to S11 are obtained. At step S13, the air conditioning controller 40 waits for a control period τ. Subsequently, the air conditioning controller 40 recognizes the elapse of the control period τ, thereby performing the control operation of step S2.

Figure 5:
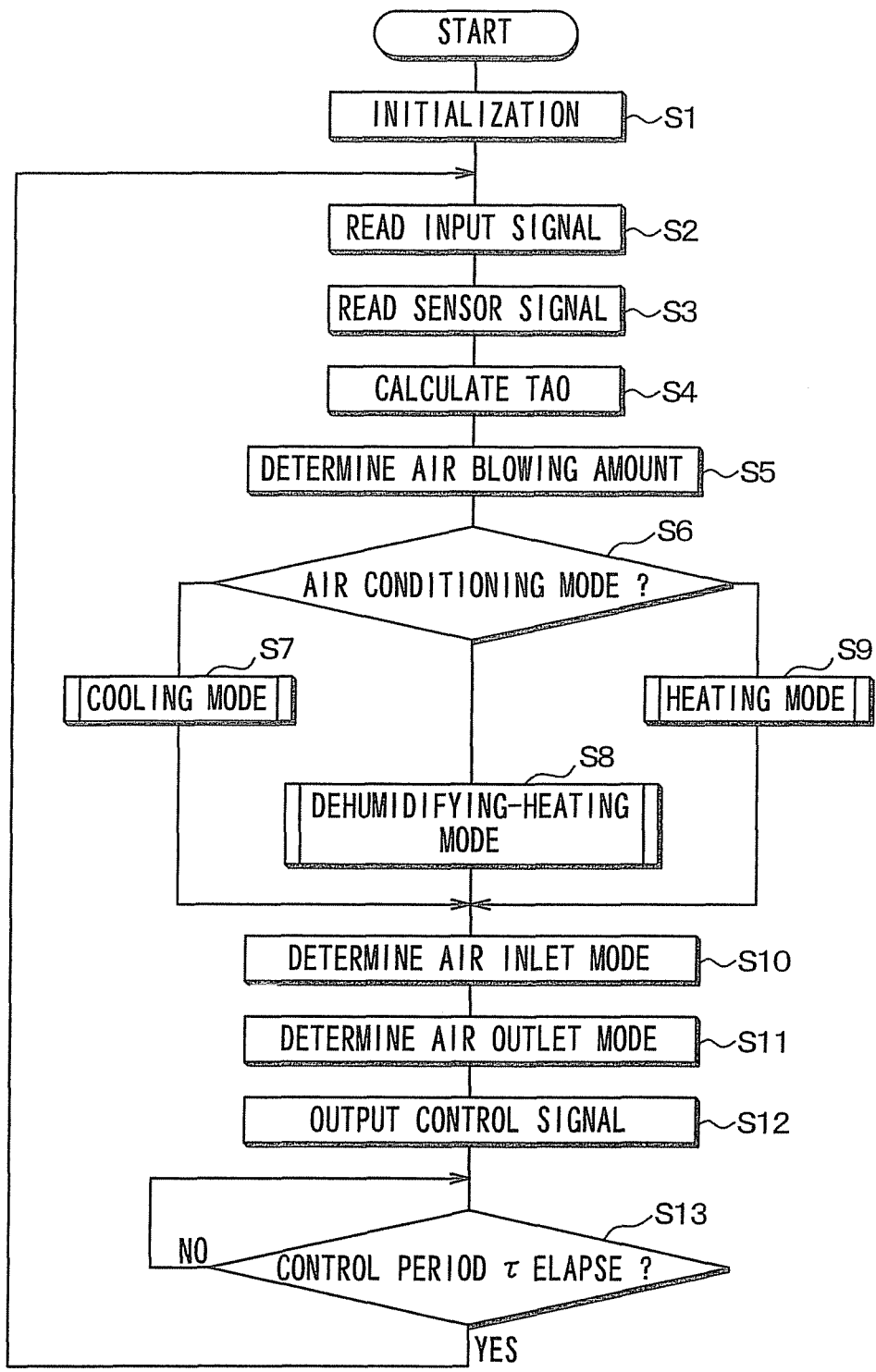
FIG. 5 is a flowchart showing a control process of the vehicle air conditioner according to the first embodiment.

In the control routine shown in FIG. 5, the air conditioning controller 40 repeats the above-described control operations: reading detection signals and control signals→determination of the control states of the various controlled components→output of control signals and control voltages to the various controlled components. The control routine is performed until the operation of the vehicle air conditioner 1 is required to be stopped by turning the activation switch OFF, for example. Next, details of the air conditioning mode performed at steps S7 to S9 will be described.

(a) Cooling Mode

The cooling mode performed at step S7 will be described. In the cooling mode, the air conditioning controller 40 fully opens the first expansion valve 13, and makes the second expansion valve 22 to be in a decompression state in which its open degree is reduced and its decompression effect is exerted. Additionally, the air conditioning controller 40 closes the first and third open-close valves 16a, 16c, and opens the second open-close valve 16b.

Therefore, when the air conditioning controller 40 outputs control signals and control voltages to the various controlled components at step S12 shown in FIG. 5, the refrigerant circuit of the heat pump cycle 10 as shown by solid arrows in FIG. 1 is provided. In this cycle configuration of the cooling mode, the air conditioning controller 40 determines an operation states of the various air conditioning components connected to the output side of the air conditioning controller 40 based on the target outlet temperature TAO determined at step S4 and detection signals from the sensor group 41.

For example, a rotation rate Nc of the compressor 11 (i.e., control signal outputted to the electrical motor of the compressor 11) is determined as follows. First, a target evaporator temperature TEO of the interior evaporator 23 is determined based on the target outlet temperature TAO by using a control map stored in the air conditioning controller 40. The target evaporator temperature TEO is determined so as to be equal to or higher than a predetermined temperature (e.g., 1° C.) which is higher than a frost formation temperature (i.e., 0° C.), in order to prevent the interior evaporator 23 from frosting.

And then, the rotation rate Nc is determined based on a deviation between the target evaporator temperature TEO and a temperature of air flowing out of the evaporator 23 detected by the evaporator temperature sensor, so that the temperature of air flowing out of the evaporator 23 approaches the target evaporator temperature TEO by a feedback control.

A control signal outputted to the second expansion valve 22 is determined such that a supercooling degree of refrigerant flowing into the second expansion valve 22 approaches a predetermined target supercooling degree. The target supercooling degree is determined so that the COP approaches approximately a largest value. A control signal outputted to the servomotor of the air mix door 34 is determined so that the air mix door 34 closes an air passage of the interior condenser 12 and that a total amount of air flowing out of the interior evaporator 23 flows into the bypass air passage 35.

The above-described control routine such as, reading detection signals and control signals→calculation of the target outlet temperature TAO→determination of the operation conditions of the various air conditioning components→output of control voltages and control signals, is repeated until the air conditioning mode is switched to the dehumidifying-heating mode or to the heating mode at step S6 shown in FIG. 5, or until the vehicle air conditioner 1 is required to be stopped by, for example, a control signal from the control panel.

In the heat pump cycle 10 in the cooling mode, high pressure refrigerant (at a point $a_6$ in FIG. 6) discharged from the discharge port 11c of the compressor 11 flows into the interior condenser 12. Because the air mix door 34 closes the air passage of the interior condenser 12, the high pressure refrigerant flowing in the interior condenser 12 flows out of the interior condenser 12 with little heat radiation.

The refrigerant flowing out of the interior condenser 12 flows through in an order: the first expansion valve 13→the gas-liquid separator 14→the second open-close valve 16b, and then flows into the exterior heat exchanger 20. Because the first expansion valve 13 is fully open, the refrigerant flowing out of the interior condenser 12 flows through the first expansion valve 13 with little decompression. Subsequently, the refrigerant flowing out of the first expansion valve 13 flows into the gas-liquid separator 14 from the inflow port 14b of the gas-liquid separator 14.

Here, the refrigerant flowing into the gas-liquid separator 14 is in a gas state because the refrigerant almost does not exchange heat with air in the interior condenser 12. Thus, the gas refrigerant flows out of the liquid outflow port 14d without gas-liquid separation in the gas-liquid separator 14. Moreover, the first open-close valve 16a is closed, so that the gas refrigerant does not flow out of the gas outflow port 14c.

The gas refrigerant flowing out of the liquid outflow port 14d flows into the exterior heat exchanger 20 via the bypass passage 18 without flowing into the fixed throttle 17. The refrigerant flowing into the exterior heat exchanger 20 exchanges heat with outside air blown by the blower fan 21 as shown by the point $a_6$→a point $b_6$ in FIG. 6.

The refrigerant flowing out of the exterior heat exchanger 20 flows into the second expansion valve 22 which is in the decompression state, because the third open-close valve 16c is closed. And then, the refrigerant flowing into the second expansion valve 22 changes into low pressure refrigerant through isenthalpic expansion and decompression as shown by the point $b_6$→a point $c_6$ in FIG. 6. The low pressure refrigerant having decompressed in the second expansion valve 22 flows into the interior evaporator 23 to absorb heat from air blown by the blower 32 and to evaporate as shown by the point $c_6$→a point $d_6$ in FIG. 6. Accordingly, the air to be blown into the vehicle compartment is cooled.

The refrigerant flowing out of the interior evaporator 23 is separated into gas refrigerant and liquid refrigerant in the accumulator 24. The gas refrigerant is drawn into the compressor 11 from the suction port 11a as shown by a point $e_6$ in FIG. 6, and is compressed again by the lower-stage compression mechanism and then by the higher-stage compression mechanism as shown by the point $e_6$→a point $a1_6$→the point $a_6$ in FIG. 6.

Figure 6:
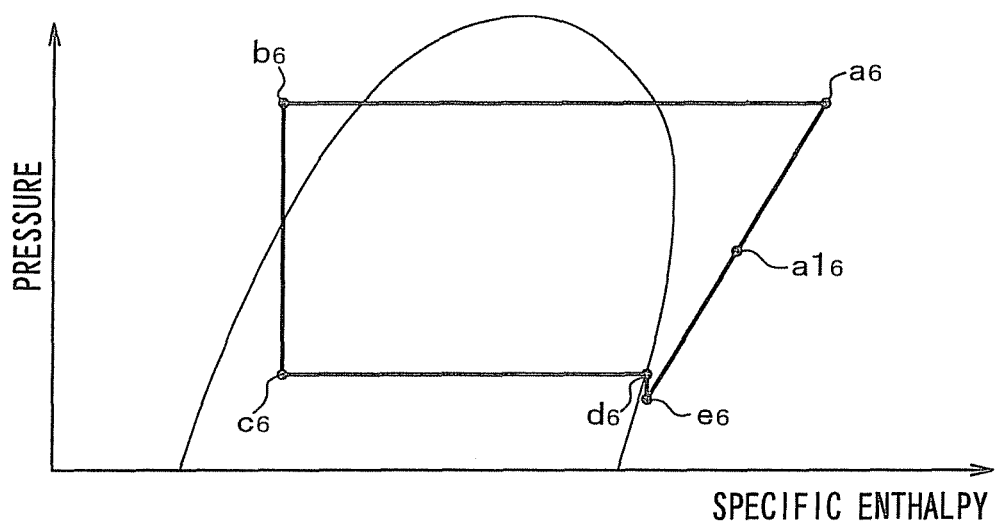
FIG. 6 is a Mollier diagram showing a refrigerant state in the heat pump cycle in the cooling mode, according to the first embodiment.

Here, the reason, why the point $d_6$ and the point $e_6$ are different from each other in FIG. 6, is that a pressure loss is generated in the gas refrigerant passing through a refrigerant pipe from the accumulator 24 to the suction port 11a of the compressor 11. Ideally, the point $d_6$ and the point $e_6$ are identical with each other. The reason of the difference is similar to the following drawings.

As described above, in the cooling mode, because the air mix door 34 closes the air passage of the interior condenser 12, air cooled in the interior evaporator 23 can be blown into the vehicle compartment without passing through the interior condenser 12. Accordingly, cooling of the vehicle compartment can be performed.

In the cooling mode, as described above, refrigerant flowing out of the interior condenser 12 used as an example of the heating heat exchanger flows through in the order: the first expansion valve 13 used as an example of the first expansion device→the gas-liquid separator 14→the exterior heat exchanger 20→the second expansion valve 22 used as an example of the third expansion device→the interior evaporator 23 used as an example of the cooling heat exchanger→the accumulator 24→the suction port 11a of the compressor 11.

(b) Dehumidifying-Heating Mode

Details of the dehumidifying-heating mode performed at step S8 will be described referring to FIGS. 7 to 14.

As described above, in the heat pump cycle 10 of the present embodiment, the two air conditioning modes: the normal dehumidifying-heating mode and the injection dehumidifying-heating mode can be selectively switched therebetween as the dehumidifying-heating mode. The normal dehumidifying-heating mode is generally selected as compared with the injection dehumidifying-heating mode.

Figure 7:
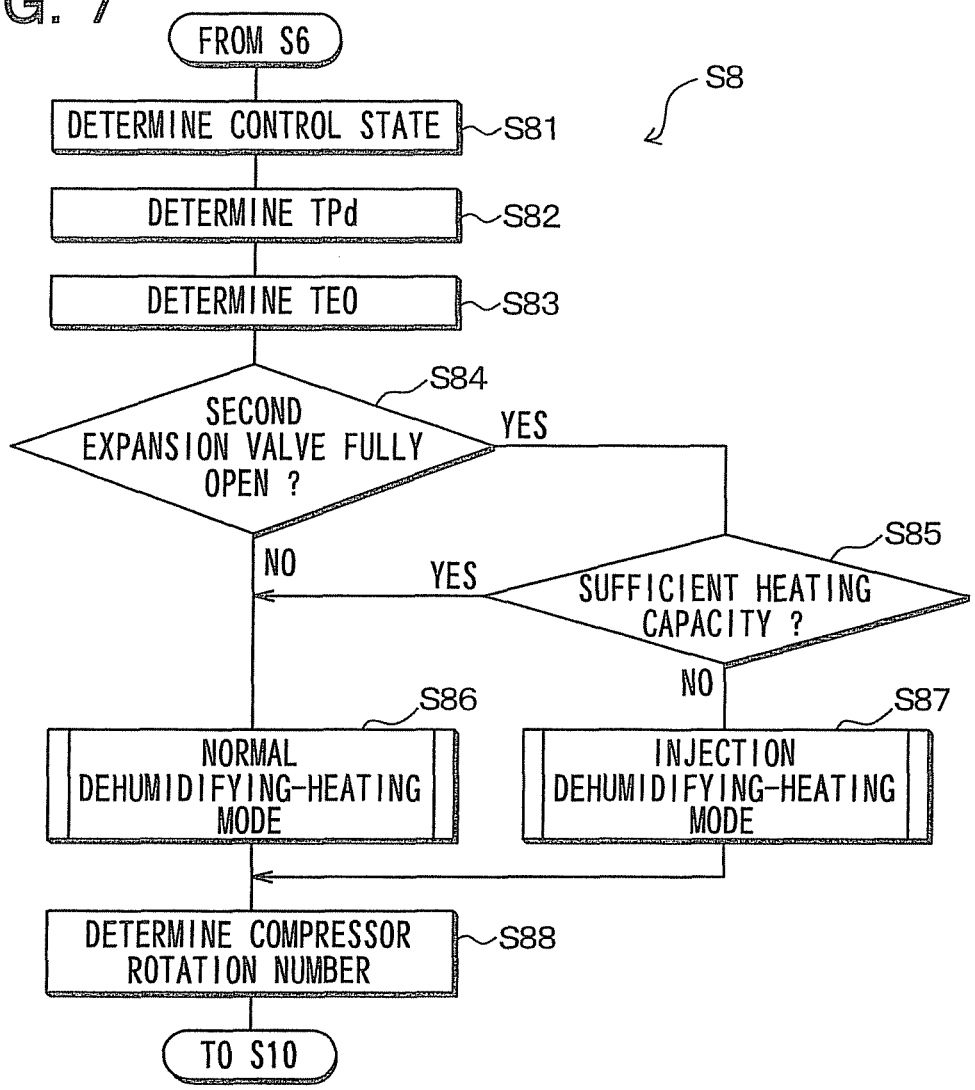
FIG. 7 is a flowchart showing a part of the control process of the vehicle air conditioner in the dehumidifying-heating mode, according to the first embodiment.

At step S81 in FIG. 7, the air conditioning controller 40 determines control states of the first and second expansion valves 13, 22, the air mix door 34, the first to third open-close valves 16a, 16b, 16c in the normal dehumidifying-heating mode.

Specifically, the air conditioning controller 40 makes the first expansion valve 13 to be in a fully open state or in the decompression state, and makes the second expansion valve 22 to be in a fully open state or in the decompression state. Moreover, the air conditioning controller 40 closes the first and third open-close valves 16a, 16c, and opens the second open-close valve 16b. Additionally, the air conditioning controller 40 determines the control state of the servomotor of the air mix door 34 such that an open degree of the air mix door 34 is set to be smallest to close the bypass air passage 35.

Therefore, at step S12 in FIG. 5, when control signals and control voltages are outputted to the various controlled components, the refrigerant circuit of the heat pump cycle 10 shown by the solid arrows in FIG. 1 is provided, similarly to the cooling mode.

At step S82, the air conditioning controller 40 determines a target pressure TPd of a higher-pressure side refrigerant pressure Pd between the discharge port 11c of the compressor 11 and the inlet side of the first expansion valve 13 in the heat pump cycle 10. Specifically, the target pressure TPd is determined based on the target outlet temperature TAO determined at step S4 in FIG. 5 by using a control map stored in the air conditioning controller 40, such that a temperature of air blown into the vehicle compartment becomes the target outlet temperature TAO. And then, the air conditioning controller 40 performs a control operation of step S83.

At step S83, the air conditioning controller 40 determines the target evaporator temperature TEO of the interior evaporator 23, and then performs a control operation of step S84. Specifically, the target evaporator temperature TEO is determined based on the target pressure TPd determined at step S82 by using a control map stored in the air conditioning controller 40, such that the higher-pressure side refrigerant pressure Pd becomes the target pressure TPd. The target evaporator temperature TEO is determined to be equal to or higher than a predetermined temperature (e.g., 1° C.) which is higher than the frost formation temperature, in order to prevent the interior evaporator 23 from frosting.

At step S84, the air conditioning controller 40 determines whether the second expansion valve 22 is fully open (in the fully open state) or not. When the second expansion valve 22 is fully open, the air conditioning controller 40 performs a control operation of step S85 to determine whether an air heating capacity of the interior condenser 12 is insufficient or not. When the second expansion valve 22 is not fully open, the air conditioning controller 40 performs a control process of the normal dehumidifying-heating mode at step S86.

Figure 8:
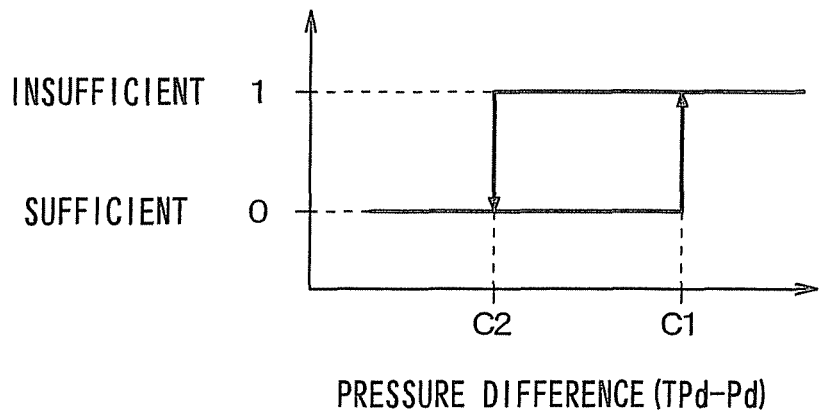
FIG. 8 is a control characteristic diagram for a control in the dehumidifying-heating mode according to the first embodiment.

At step S85, when the air heating capacity of the interior condenser 12 is determined to be insufficient (i.e., when a control flag shown in FIG. 8 is 1), the air conditioning controller 40 performs a control process of the injection dehumidifying-heating mode at step S87. On the other hand, at step S85, when the air heating capacity of the interior condenser 12 is determined to be sufficient (i.e., when the control flag shown in FIG. 8 is 0), the air conditioning controller 40 performs the control process of the normal dehumidifying-heating mode at step S86.

Specifically, at step S85, when a pressure difference obtained by subtracting the present higher-pressure side refrigerant pressure Pd from the target pressure TPd becomes equal to or higher than a predetermined first criterion value C1 in an increasing process in which the pressure difference increases, the air conditioning controller 40 determines the air heating capacity to be insufficient and thereby sets the control flag to be 1. When the pressure difference becomes equal to or lower than a predetermined second criterion value C2 in a decreasing process in which the pressure difference decreases, the air conditioning controller 40 determines the air heating capacity to be sufficient and thereby sets the control flag to be 0. A difference between the first and second criterion values C1, C2 is set as a hysteresis error for prevention of control hunting.

The higher-pressure side refrigerant pressure Pd is a physical amount having a correlation with a refrigerant condensation temperature of the interior condenser 12. Thus, the pressure difference obtained by subtracting the higher-pressure side refrigerant pressure Pd from the target pressure TPd is a value having a correlation with a temperature difference obtained by subtracting an actual temperature of air immediately after flowing out of the interior condenser 12 from the target outlet temperature TAO.

Therefore, the control operation of step S85 can be represented as a control operation in which the normal dehumidifying-heating mode and the injection dehumidifying-heating mode are switched therebetween based on the temperature difference obtained by subtracting the air temperature immediately after flowing out of the interior condenser 12 from the target outlet temperature TAO. This means that the normal dehumidifying-heating mode is switched to the injection dehumidifying-heating mode when the temperature difference is equal to or higher than a predetermined temperature difference.

At step S88 after steps S86, S87, the air conditioning controller 40 determines the rotation rate Nc of the compressor 11 by a feedback control such that the higher-pressure side refrigerant pressure Pd approaches the target pressure TPd, and then performs the control operation of step S10.

Next, details of the normal dehumidifying-heating mode performed at step S86 will be described below. In the normal dehumidifying-heating mode, open degrees of the first and second expansion valves 13, 22 are changed in accordance with increase of the target outlet temperature TAO. Specifically, a pressure reducing amount of refrigerant in the first expansion valve 13 is increased, and a pressure reducing amount of refrigerant in the second expansion valve 22 is decreased, in accordance with the increase of the target outlet temperature TAO. Hence, the normal dehumidifying-heating mode includes first to forth dehumidifying-heating modes, and one of the four dehumidifying-heating modes is performed in the normal dehumidifying-heating mode depending on the target outlet temperature TAO.

(b)(i) First Dehumidifying-Heating Mode

A first dehumidifying-heating mode is one example of the normal dehumidifying-heating mode. In the first dehumidifying-heating mode, the first expansion valve 13 is fully open and the second expansion valve 22 is in a decompression state, so that a cycle configuration (refrigerant circuit) of the first dehumidifying-heating mode is similar to that of the cooling mode. The air mix door 34 is adjusted to fully open the air passage of the interior condenser 12.

Figure 9:
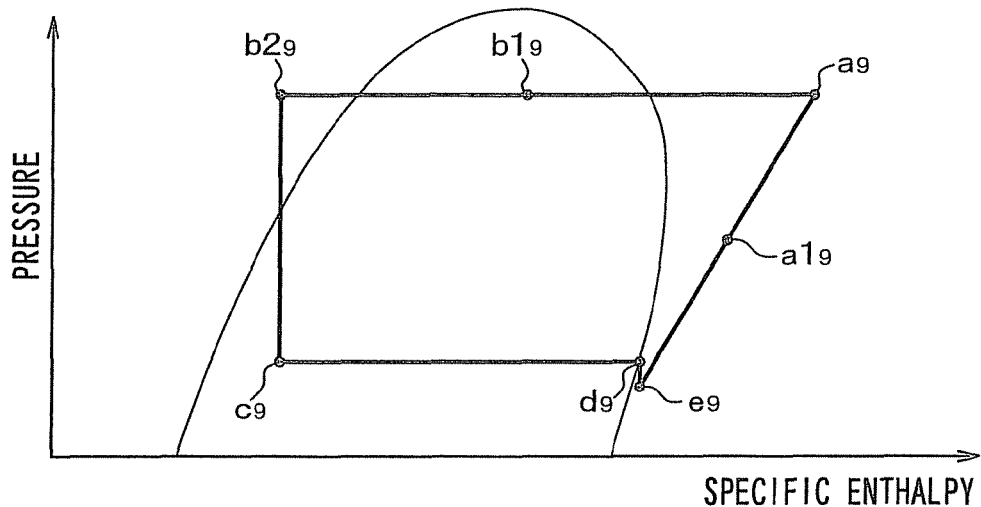
FIG. 9 is a Mollier diagram showing a refrigerant state in the heat pump cycle in a first dehumidifying-heating mode, according to the first embodiment.

High pressure refrigerant discharged from the discharge port $11c$ of the compressor 11, shown by a point $a_9$ in FIG. 9, flows into the interior condenser 12 and radiates heat by heat exchange with air having cooled and dehumidified in the interior evaporator 23, as shown by the point $a_9 \rightarrow$ a point $b1_9$ in FIG. 9. Accordingly, air to be blown into the vehicle compartment is heated in the interior condenser 12.

The refrigerant flowing out of the interior condenser 12 flows through in the order: the first expansion valve 13→the gas-liquid separator 14→the second open-close valve 16b, and then the refrigerant flows into the exterior heat exchanger 20. The high pressure refrigerant flowing into the heat exchanger 20 radiates heat by heat exchange with outside air blown by the blower fan 21 as shown by the point $b1_9 \rightarrow$ a point $b2_9$ in FIG. 9. A subsequent refrigerant flow and corresponding state change of the refrigerant are similar to those of the cooling mode. That is, the other operation states of the first dehumidifying-heating mode are similar to those of the cooling mode.

As described above, air having cooled and dehumidified in the interior evaporator 23 can be heated in the interior condenser 12 and can be blown into the vehicle compartment. Accordingly, dehumidifying and heating of the vehicle compartment can be performed.

(b)(ii) Second Dehumidifying-Heating Mode

When the target outlet temperature TAO becomes higher than a first reference temperature during performing the first dehumidifying-heating mode, a second dehumidifying-heating mode is performed. The second dehumidifying-heating mode is another example of the normal dehumidifying-heating mode. In the second dehumidifying-heating mode, the first expansion valve 13 is in a decompression state, and the second expansion valve 22 is in a decompression state in which the open degree of the second expansion valve 22 is larger than that in the first dehumidifying-heating mode.

Hence, the pressure reducing amount of refrigerant in the first expansion valve 13 in the second dehumidifying-heating mode is larger than in the first dehumidifying-heating mode, and the pressure reducing amount of refrigerant in the second expansion valve 22 in the second dehumidifying-heating mode is smaller than in the first dehumidifying-heating mode.

Figure 10:
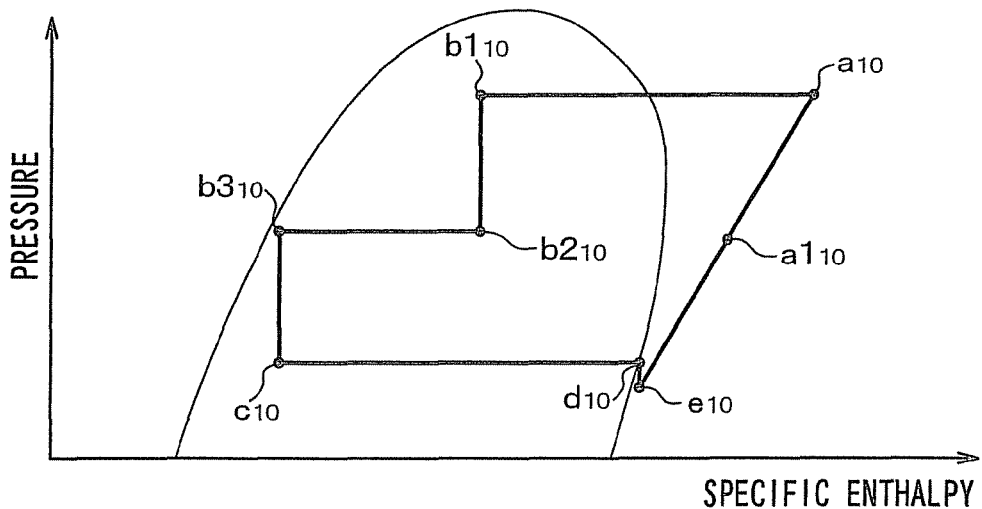
FIG. 10 is a Mollier diagram showing a refrigerant state in the heat pump cycle in a second dehumidifying-heating mode, according to the first embodiment.

Similarly to the first dehumidifying-heating mode, high pressure refrigerant discharged from the discharge port $11c$ of the compressor 11, shown by a point $a_{10}$ in FIG. 10, flows into interior condenser 12 and radiates heat by heat exchange with air having cooled and dehumidified in the interior evaporator 23, as shown by the point $a_{10} \rightarrow$ a point $b1_{10}$ in FIG. 10. Accordingly, air to be blown into the vehicle compartment is heated in the interior condenser 12.

The high pressure refrigerant flowing out of the interior condenser 12 changes into intermediate pressure refrigerant through isenthalpic decompression in the first expansion valve 13 which is in a decompression state, as shown by the point $b1_{10} \rightarrow$ a point $b2_{10}$ in FIG. 10. The intermediate pressure refrigerant flowing out of the first expansion valve 13 flows through in an order: the gas-liquid separator 14→the second open-close valve 16b, and then the refrigerant flows into the exterior heat exchanger 20. The intermediate pressure refrigerant flowing into the exterior heat exchanger 20 radiates heat by heat exchange with outside air blown by the blower fan 21. A subsequent refrigerant flow and corresponding state change of the refrigerant are similar to those of the cooling mode.

As described above, in the second dehumidifying-heating mode, air having cooled and dehumidified in the interior evaporator 23 can be heated in the interior condenser 12 and can be blown into the vehicle compartment, similarly to the first dehumidifying-heating mode. Accordingly, dehumidifying and heating of the vehicle compartment can be performed.

Because the first expansion valve 13 is in a decompression state in the second dehumidifying-heating mode, a temperature of refrigerant passing through the exterior heat exchanger 20 can be reduced relative to the case of the first dehumidifying-heating mode. Thus, a temperature difference between the refrigerant and outside air in the exterior heat exchanger 20 can be reduced, and a heal radiation amount of refrigerant in the exterior heat exchanger 20 can be thereby reduced.

As a result, a heat radiation amount of refrigerant in the interior condenser 12 can be increased, and the air heating capacity of the interior condenser 12 can be thereby improved relative to the case of the first dehumidifying-heating mode.

(b)(iii) Third Dehumidifying-Heating Mode

When the target outlet temperature TAO becomes higher than a second reference temperature during performing the second dehumidifying-heating mode, a third dehumidifying-heating mode is performed. The third dehumidifying-heating mode is another example of the normal dehumidifying-heating mode. In the third dehumidifying-heating mode, the open degree of the first expansion valve 13 is adjusted to be smaller than that in the second dehumidifying-heating mode, and the open degree of the second expansion valve 22 is adjusted to be larger than that in the second dehumidifying-heating mode.

Hence, in the third dehumidifying-heating mode, the pressure reducing amount of refrigerant in the first expansion valve 13 is larger than in the second dehumidifying-heating mode, and the pressure reducing amount of refrigerant in the second expansion valve 22 is smaller than in the second dehumidifying-heating mode.

Figure 11:
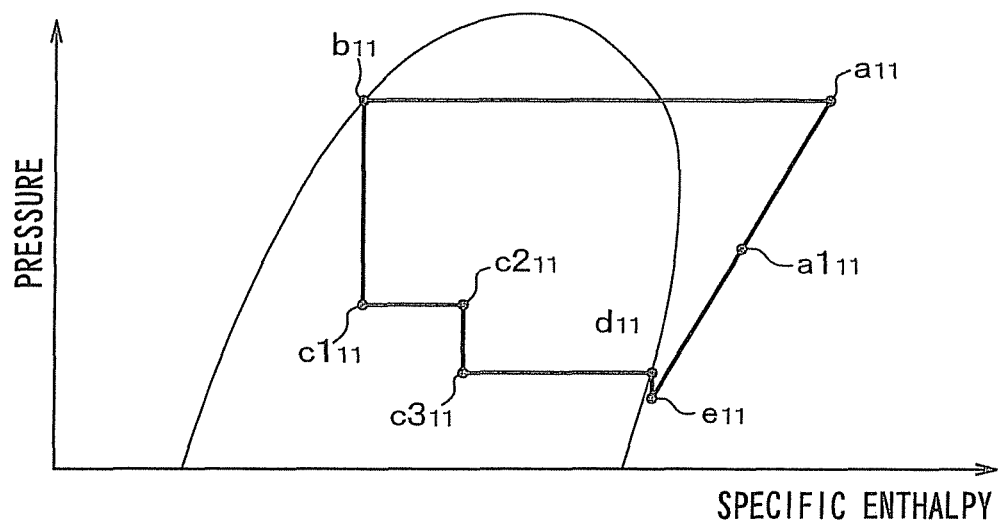
FIG. 11 is a Mollier diagram showing a refrigerant state in the heat pump cycle in a third dehumidifying-heating mode, according to the first embodiment.

Similarly to the first and second dehumidifying-heating modes, high pressure refrigerant discharged from the discharge port $11c$ of the compressor 11, shown by a point $a_{11}$ in FIG. 11, flows into interior condenser 12 and radiates heat by heat exchange with air having cooled and dehumidified in the interior evaporator 23, as shown by the point $a_{11} \rightarrow$ a point $b_{11}$ in FIG. 11. Accordingly, air to be blown into the vehicle compartment is heated in the interior condenser 12.

The high pressure refrigerant flowing out of the interior condenser 12 changes into intermediate pressure refrigerant through isenthalpic decompression of the first expansion valve 13 which is in the decompression state, as shown by the point $b_{11} \rightarrow$ a point $c1_{11}$ in FIG. 11. The intermediate pressure refrigerant flowing out of the first expansion valve 13 flows through in an order: the gas-liquid separator 14→the second open-close valve 16b, and then the refrigerant flows into the exterior heat exchanger 20.

The intermediate pressure refrigerant flowing into the exterior heat exchanger 20 absorbs heat by heat exchange with outside air blown by the blower fan 21 as shown by the point $c1_{11} \to$ a point $c2_{11}$ in FIG. 11. The refrigerant flowing out of the exterior heat exchanger 20 is decompressed by the second expansion valve 22 without a change of an enthalpy of the refrigerant as shown by the point $c2_{11} \to$ a point $c3_{11}$ in FIG. 11, and then flows into the interior evaporator 23. A subsequent refrigerant flow and corresponding state change of the refrigerant are similar to those of the cooling mode.

As described above, in the third dehumidifying-heating mode, air having cooled and dehumidified in the interior evaporator 23 can be heated in the interior condenser 12 and can be blown into the vehicle compartment, similarly to the first and second dehumidifying-heating modes. Accordingly, dehumidifying and heating of the vehicle compartment can be performed.

Because the exterior heat exchanger 20 is used as an evaporator by reducing the open degree of the first expansion valve 13 in the third dehumidifying-heating mode, a heat absorption amount of refrigerant from outside air can be increased. Thus, a heat radiation amount of refrigerant in the interior condenser 12 can be increased, and the air heating capacity of the interior condenser 12 can be thereby improved relative to the second dehumidifying-heating mode.

(b)(iv) Fourth Dehumidifying-Heating Mode

When the target outlet temperature TAO becomes higher than a third reference temperature during performing the third dehumidifying-heating mode, a fourth dehumidifying-heating mode is performed. The fourth dehumidifying-heating mode is another example of the normal dehumidifying-heating mode. In the fourth dehumidifying-heating mode, the open degree of the first expansion valve 13 is adjusted to be smaller than in the third dehumidifying-heating mode, and the open degree of the second expansion valve 22 is fully open.

Hence, in the fourth dehumidifying-heating mode, the pressure reducing amount of refrigerant in the first expansion valve 13 is larger than in the third dehumidifying-heating mode, and the pressure reducing amount of refrigerant in the second expansion valve 22 is smaller than in the third dehumidifying-heating mode.

Figure 12:
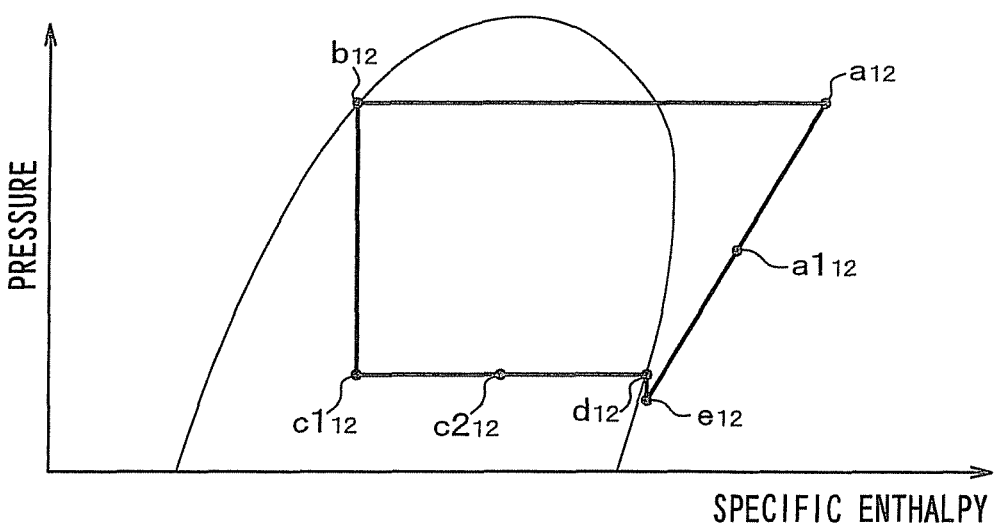
FIG. 12 is a Mollier diagram showing a refrigerant state in the heat pump cycle in a fourth dehumidifying-heating mode, according to the first embodiment.

Similarly to the first to third dehumidifying-heating modes, high pressure refrigerant discharged from the discharge port 11c of the compressor 11, shown by a point $a_{12}$ in FIG. 12, flows into interior condenser 12 and radiates heat by heat exchange with air having cooled and dehumidified in the interior evaporator 23, as shown by the point $a_{12} \to$ a point $b_{12}$ in FIG. 12. Accordingly, air to be blown into the vehicle compartment is heated in the interior condenser 12.

The refrigerant flowing out of the interior condenser 12 changes into low pressure and temperature refrigerant through isenthalpic decompression in the first expansion valve 13 which is in the decompression state, as shown by the point $b_{12} \to$ a point $c1_{12}$ in FIG. 12. The low pressure refrigerant flowing out of the first expansion valve 13 flows through in the order: the gas-liquid separator 14 → the second open-close valve 16b, and then the refrigerant flows into the exterior heat exchanger 20.

The low pressure refrigerant flowing into the exterior heat exchanger 20 absorbs heat by heat exchange with outside air blown by the blower fan 21 as shown by the point $c1_{12} \to$ a point $c2_{12}$ in FIG. 12. The refrigerant flowing out of the exterior heat exchanger 20 flows into the interior evaporator 23 without decompression because the second expansion valve 22 is fully open. A subsequent refrigerant flow and corresponding state change of the refrigerant are similar to those of the cooling mode.

As described above, in the fourth dehumidifying-heating mode, air having cooled and dehumidified in the interior evaporator 23 can be heated in the interior condenser 12 and can be blown into the vehicle compartment, similarly to the first to third dehumidifying-heating modes. Accordingly, dehumidifying and heating of the vehicle compartment can be performed.

In the fourth dehumidifying-heating mode, similarly to the third dehumidifying-heating mode, the exterior heat exchanger 20 is used as an evaporator, and the open degree of the first expansion valve 13 is smaller than in the third dehumidifying-heating mode. Hence, a refrigerant evaporation temperature in the exterior heat exchanger 20 can be reduced.

Therefore, the temperature difference between refrigerant and outside air in the exterior heat exchanger 20 can be increased, and the heat absorption amount of refrigerant from outside air can be increased, relative to the third dehumidifying-heating mode. As a result, a heat radiation amount of refrigerant in the interior condenser 12 can be increased, and the air heating capacity of the interior condenser 12 can be thereby improved relative to the third dehumidifying-heating mode.

As described above, in the normal dehumidifying-heating mode, the pressure reducing amount of refrigerant in the first expansion valve 13 is increased and the pressure reducing amount of refrigerant in the second expansion valve 22 is decreased in accordance with increase of the target outlet temperature TAO, so that the normal dehumidifying-heating mode is switched from the first to fourth dehumidifying-heating modes in stages in accordance with the TAO. Accordingly, the air heating capacity of the interior condenser 12 can be improved.

In the present embodiment, in order to prevent frost formation on the interior evaporator 23, a refrigerant evaporation temperature in the interior evaporator 23 is maintained equal to or higher than 1° C. Thus, if the second expansion valve 22 is fully open similarly to the fourth dehumidifying-heating mode, refrigerant evaporation temperatures in both the exterior heat exchanger 20 and the interior evaporator 23 are maintained equal to or higher than 1° C.

If the refrigerant evaporation temperatures in both the exterior heat exchanger 20 and the interior evaporator 23 reach 1° C. in the fourth dehumidifying-heating mode, the heat absorption amount of refrigerant cannot be increased any more, and also the heat radiation amount of refrigerant in the interior condenser 12 cannot be increased any more. When the air heating capacity is insufficient in the normal dehumidifying-heating mode as described in the above description of step S85, the normal dehumidifying-heating mode is switched to the injection dehumidifying-heating mode in the present embodiment.

(b)(v) Injection Dehumidifying-Heating Mode

Details of the control process of the injection dehumidifying-heating mode performed at step S87 in FIG. 7 will be described with reference to the flowchart shown in FIG. 13. At step S871 in FIG. 13, control states of the first and second expansion valves 13, 22 and the first to third open-close valves 16a, 16b, 16c in the injection dehumidifying-heating mode are determined.

Specifically, the open degree of the first expansion valve 13 is adjusted as the same as that in the fourth dehumidifying-heating mode, and the second expansion valve 22 is fully open. The first open-close valve 16a is open, and the second and third open-close valves 16b, 16c are closed.

Therefore, when the air conditioning controller 40 outputs control signals and control voltages at step S12 shown in FIG. 5, the refrigerant circuit of the heat pump cycle 10 shown by solid arrows in FIG. 2 is provided.

At step S872, the air conditioning controller 40 determines whether a present higher-pressure side refrigerant pressure Pd is higher than the target pressure TPd or not. When the present higher-pressure side refrigerant pressure Pd is higher than the target pressure TPd, a control operation of step S873 is performed. When the present higher-pressure side refrigerant pressure Pd is not higher than the target pressure TPd, a control operation of step S874 is performed.

At step S873, the air conditioning controller 40 determines whether a present open degree of the first expansion valve 13 is smaller than a largest open degree or not, i.e., whether the first expansion valve 13 is fully open or not. When the present open degree of the first expansion valve 13 is smaller than the largest open degree, a control operation of step S875 is performed. At step S875, the present open degree of the first expansion valve 13 is increased by a predetermined degree, and then the control operation of step S88 is performed.

On the other hand, when the present open degree of the first expansion valve 13 is not smaller than the largest open degree, i.e., when the present open degree is equal to the largest open degree, the open degree of the first expansion valve 13 cannot be increased any more. Thus, the present open degree is maintained, and then the control operation of step S88 is performed.

At step S874, the air conditioning controller 40 determines whether the present open degree of the first expansion valve 13 is larger than a smallest open degree or not. When the present open degree of the first expansion valve 13 is larger than the smallest open degree, a control operation of step S876 is performed. At step S876, the present open degree of the first expansion valve 13 is decreased by a predetermined degree, and then the control operation of step S88 is performed.

The smallest open degree is a smallest valve open degree within a possible range of a cross-sectional diameter of the first expansion valve 13, and the smallest open degree is thereby equal to $\phi 0.5$ mm in the cross-sectional diameter in the present embodiment. When the open degree of the first expansion valve 13 is the smallest open degree, the pressure reducing amount of refrigerant in the first expansion valve 13 becomes largest. The structure of the second expansion valve 22 is the same as the first expansion valve 13.

At step S874, when the present open degree of the first expansion valve 13 is not larger than the smallest open degree, i.e., when the present open degree is equal to the smallest open degree, the present open degree cannot be decreased any more. Thus, the present open degree is maintained, and then the control operation of step S88 is performed.

Figure 14:
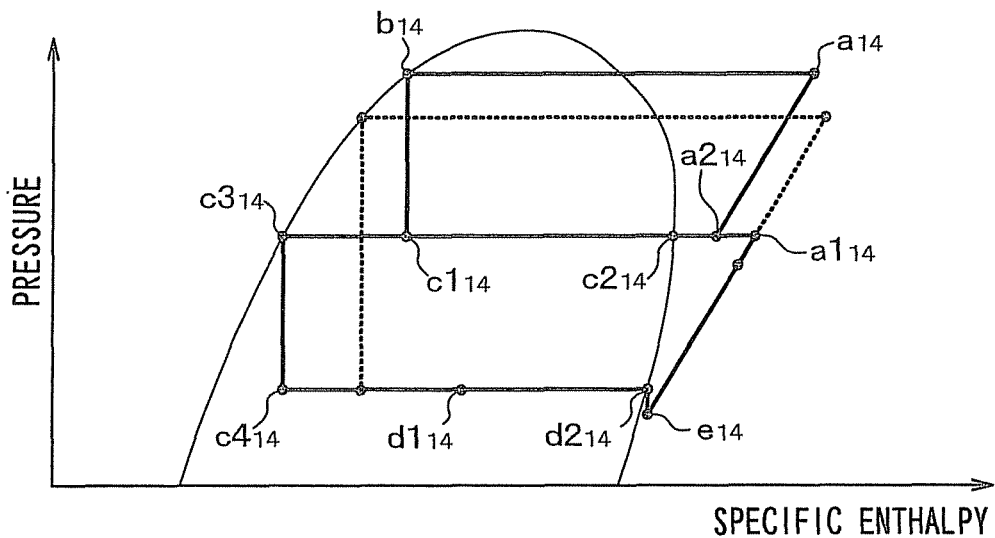
FIG. 14 is a Mollier diagram showing a refrigerant state in the heat pump cycle in the injection dehumidifying-heating mode, according to the first embodiment.

A state of refrigerant flowing in the heat pump cycle 10 in the injection dehumidifying-heating mode changes as shown in FIG. 14. In FIG. 14, the state change of refrigerant in the injection dehumidifying-heating mode is shown by the thick solid line, and the state change of refrigerant in the fourth dehumidifying-heating mode is shown by the dashed line for comparison.

In the injection dehumidifying-heating mode, high pressure refrigerant, shown by a point $a_{14}$ in FIG. 14, discharged from the discharge port 11c of the compressor 11 flows into the interior condenser 12. The refrigerant in the interior condenser 12 radiates heat through heat exchange with air which is blown from the blower 32 and has been cooled and dehumidified in the interior evaporator 23, as shown by the point $a_{14} \rightarrow$ a point $b_{14}$ in FIG. 14. Accordingly, the air to be blown into the vehicle compartment is heated in the interior condenser 12.

The high pressure refrigerant flowing out of the interior condenser 12 changes into intermediate pressure refrigerant isenthalpic decompression and expansion in the first expansion valve 13 which is in the decompression state, as shown by the point $b_{14} \rightarrow$ a point $c1_{14}$ in FIG. 14. The intermediate pressure refrigerant having been decompressed by the first expansion valve 13 is separated into gas refrigerant and liquid refrigerant in the gas-liquid separator 14 as shown by the point $c1_{14} \rightarrow$ a point $c2_{14}$, and by the point $c1_{14} \rightarrow$ a point $c3_{14}$ in FIG. 14.

The gas refrigerant flowing out of the gas-liquid separator 14 flows into the intermediate pressure port 11b of the compressor 11 via the intermediate pressure passage 15 because the first open-close valve 16a is open, as shown by the point $c2_{14} \rightarrow$ a point $a2_{14}$ in FIG. 14. Subsequently, the gas refrigerant is combined with refrigerant (a point $a1_{14}$ in FIG. 14) discharged from the lower-stage compression mechanism, and then the combined refrigerant is drawn into the higher-stage compression mechanism.

The liquid refrigerant flowing out of the gas-liquid separator 14 flows into the fixed throttle 17 because the second open-close valve 16 is closed. Subsequently, the liquid refrigerant changes into low pressure refrigerant through isenthalpic decompression and expansion by the fixed throttle 17 as shown by the point $c3_{14} \rightarrow$ a point $c4_{14}$ in FIG. 14. The refrigerant flowing out of the fixed throttle 17 flows into the exterior heat exchanger 20, thereby absorbing heat through heat exchange with outside air blown from the blower fan 21 as shown by the point $c4_{14} \rightarrow$ a point $d1_{14}$ in FIG. 14.

The third open-close valve 16c is closed and the second expansion valve 22 is fully open, and thus, the refrigerant flowing out of the exterior heat exchanger 20 flows into the interior radiator 23 without being decompressed. Then, the refrigerant absorbs heat from air blown by the blower 32 and evaporates, as shown by the point $d1_{14} \rightarrow$ a point $d2_{14}$ in FIG. 14. Accordingly, the air to be blown into the vehicle compartment is cooled.

The refrigerant flowing out of the interior radiator 23 flows into the accumulator 24 to be separated into gas refrigerant and liquid refrigerant. The gas refrigerant flowing out of the accumulator 24 is drawn into the suction port 11a of the compressor 11 as shown by a point $e_{14}$, and is compressed in the lower-stage compression mechanism, and then in the higher-stage compression mechanism as shown by the point $e_{14} \rightarrow$ the point $a1_{14} \rightarrow$ the point $a_{14}$ in FIG. 14.

As described above, in the injection dehumidifying-heating mode, air having cooled and dehumidified in the interior evaporator 23 can be heated in the interior condenser 12 and can be blown into the vehicle compartment, so that the dehumidifying-heating of the vehicle compartment can be performed.

Moreover, in the injection dehumidifying-heating mode, compression of refrigerant can be divided into two stages in the lower-stage and higher-stage compression mechanisms, and intermediate pressure refrigerant in the heat pump cycle 10 can be drawn into the higher-stage compression mechanism from the intermediate pressure port 11b. That is, a gas injection cycle (economizer refrigerant cycle) can be provided.

Accordingly, in the injection dehumidifying-heating mode, a refrigerant amount (gas injection amount) drawn into the higher-stage compression mechanism can be increased, and a temperature of high-temperature and high-pressure refrigerant discharged from the discharge port 11c of the compressor 11 can be increased more than in the fourth dehumidifying-heating mode. As a result, a compression work amount in the higher-stage compression mechanism can be increased, and the air heating capacity of the interior condenser 12 can be thereby increased sufficiently.

In the Mollier diagram of FIG. 14, in the injection dehumidifying-heating mode, it is shown that the temperature of high-temperature and high-pressure refrigerant discharged from the compressor 11 is increased more than in the fourth dehumidifying-heating mode. However, based on a study of the inventor, even though the temperature of the high-temperature and high-pressure refrigerant discharged from the compressor 11 in the injection dehumidifying-heating mode is not higher than that in the fourth dehumidifying-heating mode, the air heating capacity of the interior condenser 12 can be improved sufficiently due to the increase of the compression work amount in the higher-stage compression mechanism.

Furthermore, in the injection dehumidifying-heating mode, the open degree of the first expansion valve 13 is increased in accordance with increase of the target pressure TPd, i.e., increase of the target outlet temperature TAO of air to be blown into the vehicle compartment, as described in the description of steps S873→S875. Accordingly, the refrigerant amount (gas injection amount) drawn into the intermediate pressure port 11$b$ can be increased in accordance with the increase of the target outlet temperature TAO, and the compression work amount in the higher-stage compression mechanism can be thereby increased. As a result, the air heating capacity of the interior condenser 12 can be improved sufficiently and properly.

(c) Heating Mode

Next, the heating mode performed at step S9 will be described. In the heating mode, the open degree of the first expansion valve 13 is reduced to decompress refrigerant, and the second expansion valve 22 is fully open. The control state of the servomotor for the air mix door 34 is determined such that the air mix door 34 moves to close the bypass air passage 35 as shown in FIG. 3. Additionally, the first and third open-close valves 16$a$, 16$c$ are open, and the second open-close valve 16$b$ is closed.

Accordingly, at step S12 shown in FIG. 5, when the air conditioning controller 40 outputs control signals and control voltages to the controlled components, the refrigerant circuit of the heat pump cycle 10 shown by solid arrows in FIG. 3 is provided.

The rotation rate Nc of the compressor 11 is determined such that the higher-pressure side refrigerant pressure Pd between the discharge port 11$c$ of the compressor 11 and the inlet side of the first expansion valve 13 in the heat pump cycle 10 approaches the target pressure TPd by a feedback control or the like. The target pressure TPd is determined based on the target outlet temperature TAO by using a control map stored in the air conditioning controller 40, such that the temperature of air to be blown into the vehicle compartment becomes the target outlet temperature TAO.

Figure 15:
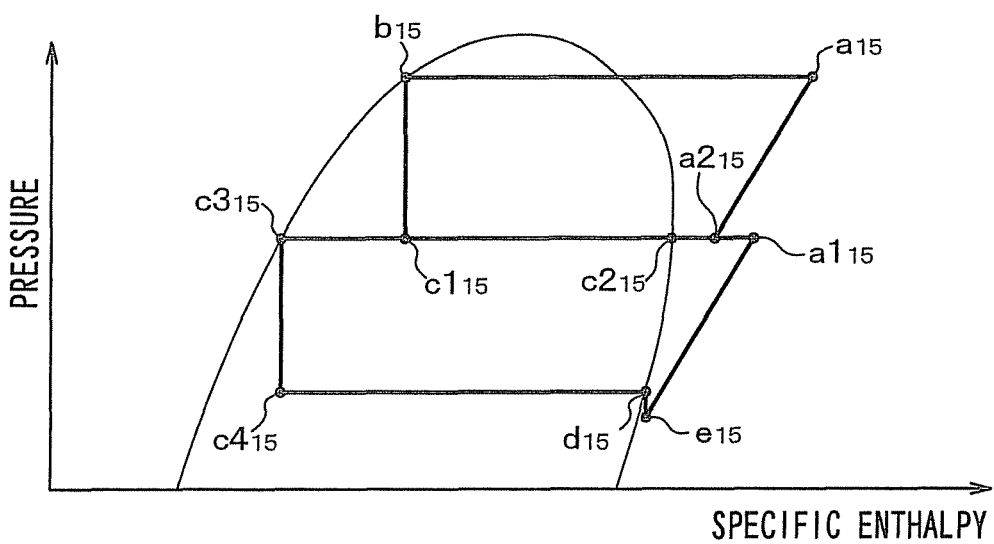
FIG. 15 is a Mollier diagram showing a refrigerant state in the heating mode in the heat pump cycle according to the first embodiment.

In the heat pump cycle 10 of the heating mode, high pressure refrigerant, shown by a point $a_{15}$ in FIG. 15, discharged from the discharge port 11$c$ of the compressor 11 flows into the interior condenser 12. The refrigerant flowing into the interior condenser 12 radiates heat through heat exchange with air which has been blown from the blower 32 and passed through the interior evaporator 23, as shown by the point $a_{15}$→a point $b_{15}$ in FIG. 15. Accordingly, the air to be blown into the vehicle compartment is heated.

The refrigerant flowing out of the interior condenser 12 changes into intermediate pressure refrigerant through isenthalpic decompression and expansion in the first expansion valve 13 in which the open degree of the first expansion valve 13 is reduced, as shown by the point $b_{15}$→a point $c1_{15}$ in FIG. 15. Subsequently, the intermediate pressure refrigerant flowing out of the expansion valve 13 is separated into gas refrigerant and liquid refrigerant in the gas-liquid separator 14 as shown by the point $c1_{15}$→a point $c2_{15}$, and by the point $c1_{15}$ a point $c3_{15}$ in FIG. 15.

And then, because the first open-close valve 16$a$ is open, the gas refrigerant flowing out of the gas-liquid separator 14 flows into the intermediate pressure port 11$b$ of the compressor 11 via the intermediate passage 15 as shown by the point $c2_{15}$→a point $a2_{15}$ in FIG. 15. The gas refrigerant flowing into the compressor 11 is combined with refrigerant (shown by a point $a1_{15}$ in FIG. 15) discharged from the lower-stage compression mechanism, and then the combined refrigerant is drawn into the higher-stage compression mechanism.

On the other hand, the liquid refrigerant flowing out of the gas-liquid separator 14 flows into the fixed throttle 17 because the second open-close valve 16$b$ is closed. Then, the liquid refrigerant changes into low pressure refrigerant through isenthalpic decompression and expansion as shown by the point $c3_{15}$→a point $c4_{15}$ in FIG. 15. The refrigerant flowing out of the fixed throttle 17 flows into the exterior heat exchanger 20, and radiates heat through heat exchange with outside air blown by the blower fan 21 as shown by the point $c4_{15}$→$d_{15}$ in FIG. 15.

Because the third open-close valve 16$c$ is open, the refrigerant flowing out of the exterior heat exchanger 20 flows into the accumulator 24 via the bypass passage 25 to be separated into gas refrigerant and liquid refrigerant. The gas refrigerant flowing out of the accumulator 24 is drawn into the suction port 11$a$ of the compressor 11 as shown by a point $e_{15}$, and then compressed. The liquid refrigerant is stored in the accumulator 24 as surplus refrigerant that is unnecessary refrigerant for providing required refrigeration performance of the heat pump cycle 10.

As described above, in the heating mode, the compressor 11 discharges refrigerant into the interior condenser 12, and then the discharged refrigerant radiates heat to air blown toward the vehicle compartment. Accordingly, heated air can be blown into the vehicle compartment, and heating of the vehicle compartment can be thereby performed.

In the heating mode, refrigerant flowing out of the interior condenser 12 flows through in the order: the first expansion valve used as an example of the first expansion device→the gas-liquid separator 14→the fixed throttle 17 used as an example of the second expansion device→the exterior heat exchanger 20→the accumulator 24. Additionally, gas refrigerant obtained by gas-liquid separation of the gas-liquid separator 14 flows into the intermediate pressure port 11$b$ of the compressor 11 via the intermediate pressure passage 15.

The heat pump cycle 10 of the present embodiment is operated as described above. Therefore, cooling of the vehicle compartment can be performed in the cooling mode, and heating of the vehicle compartment can be performed in the heating mode.

Furthermore, in the dehumidifying-heating mode, the heat pump cycle 10 is configured to be the gas injection cycle (economizer refrigerant cycle) as a whole. Therefore, even when the refrigerant evaporation temperature in the interior evaporator 23 is maintained equal to or higher than a predetermined degree, the air heating capacity of the interior condenser 12 can be improved.

Second Embodiment

The refrigerant circuit of the heat pump cycle 10 of the above-described first embodiment is configured to be capable of selecting the refrigerant circuit of the injection dehumidifying-heating mode. A heat pump cycle 10 of a second embodiment is configured to be capable of selecting a refrigerant circuit of a bypass dehumidifying-heating mode shown in FIG. 16, instead of the refrigerant circuit of the injection dehumidifying-heating mode.

Specifically, in the second embodiment, the gas outflow port 14c of the gas-liquid separator 14 is connected to the suction port 11a of the compressor 11 via an intermediate pressure passage 15. Hence, the intermediate pressure port 11b of the compressor 11 is unnecessary in the present embodiment, and the compressor 11 may be an electrical one-stage compressor.

Additionally, in the present embodiment, a variable open-close valve 16d is arranged in the intermediate pressure passage 15 instead of the first open-close valve 16a. The variable open-close valve 16d is an electromagnetic valve used as an example of an open-close portion which opens or closes the intermediate pressure passage 15, and is used also as an example of a fourth expansion device which decompresses refrigerant by narrowing a cross-section of a refrigerant flow when the intermediate pressure passage 15 is open. An operation of the variable open-close valve 16d is controlled by a control signal outputted from the air conditioning controller 40.

Instead of the variable open-close valve 16d, an open-close valve and a decompression valve may be arranged separately in the intermediate pressure passage 15 to open or close the intermediate pressure passage 15 and to decompress refrigerant flowing in the intermediate pressure passage 15.

The variable open-close valve 16d is used also as a check valve which allows refrigerant only to flow from the gas outflow opening 14f of the gas-liquid separator 14 toward the suction port 11a of the compressor 11 when the intermediate pressure passage 15 is open. Accordingly, when the variable open-close valve 16d opens the intermediate pressure passage 15, refrigerant is prevented from flowing back from the compressor 11 toward the gas-liquid separator 14.

Furthermore, the variable open-close valve 16d functions also to switch the cycle configuration (refrigerant circuit) of the heat pump cycle 10 because the variable open-close valve 16d opens or closes the intermediate pressure passage 15. Therefore, the variable open-close valve 16d serves also as an example of the refrigerant circuit switching portion which switches the refrigerant circuit of the heat pump cycle 10.

Accordingly, the refrigerant circuit of the heat pump cycle 10 of the present embodiment is capable of selecting the refrigerant circuit in the bypass dehumidifying-heating mode, instead of the refrigerant circuit in the injection dehumidifying-heating mode.

An operation of a vehicle air conditioner 1 of the present embodiment in the above-described configuration will be described with reference to FIGS. 17 to 19. A control process of the operation of the vehicle air conditioner 1 of the present embodiment is not shown in drawings because the control process is similar to the flowchart of FIG. 5.

Moreover, detailed descriptions of a cooling mode performed at step S7 of the present embodiment are omitted because the details are similar to the above-described first embodiment.

Details of a dehumidifying-heating mode performed at step S8 of the present embodiment will be described referring to FIGS. 17 and 18.

Figure 17:
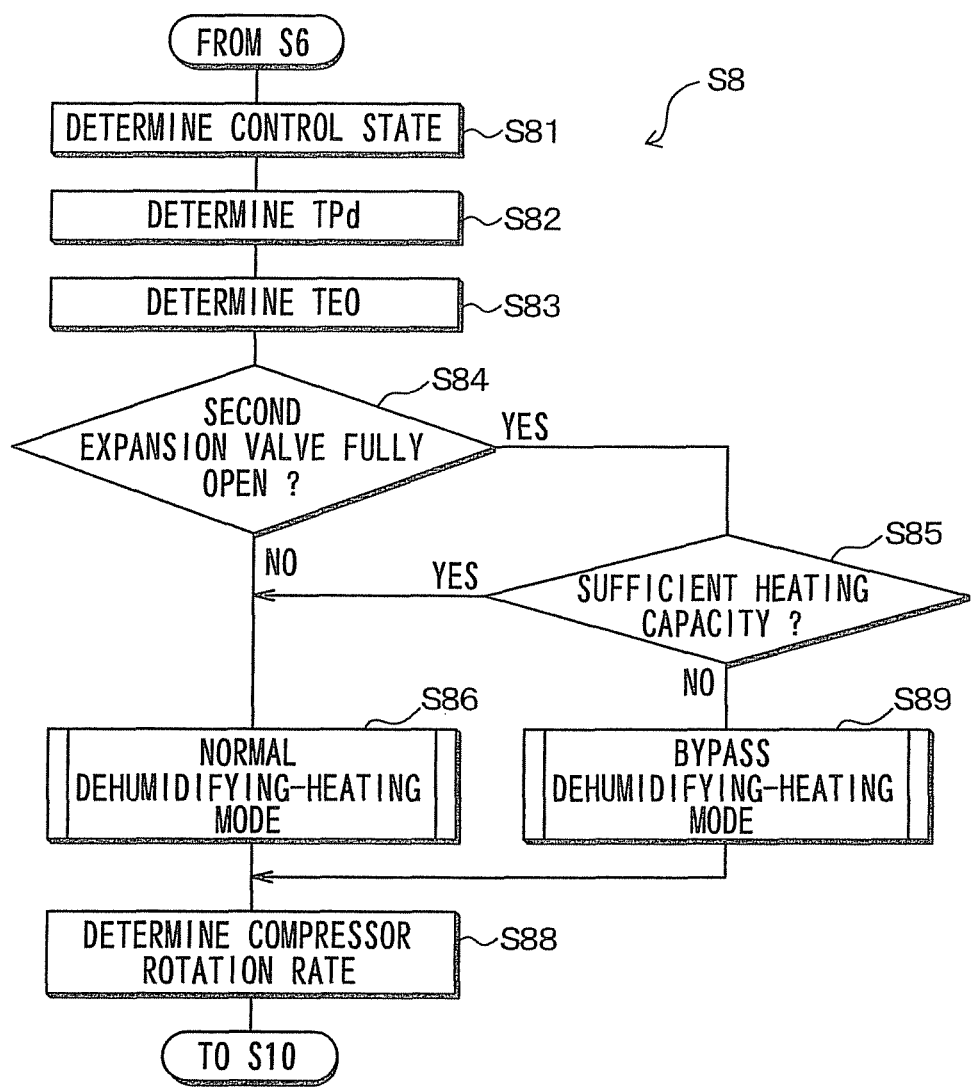
FIG. 17 is a flowchart showing a part of a control process of the vehicle air conditioner in a dehumidifying-heating mode, according to the second embodiment.

In the flowchart of FIG. 17, the control process of the injection dehumidifying-heating mode shown at S87 in FIG. 7 is changed to a control process of the bypass dehumidifying-heating mode shown at step S89.

Accordingly, in the heat pump cycle 10 of the present embodiment, a normal dehumidifying-heating mode and the bypass dehumidifying-heating mode can be selected as the dehumidifying-heating mode. The normal dehumidifying-heating mode is generally performed in priority to the bypass dehumidifying-heating mode.

That is, when the air heating capacity of the interior condenser 12 is determined to be insufficient (i.e., when the control flag shown in FIG. 8 is 1), the control process of the bypass dehumidifying-heating mode is performed at step S89. On the other hand, when the air heating capacity is determined to be sufficient (i.e., when the control flag shown in FIG. 8 is 0), a control process of the normal dehumidifying-heating mode is performed at step S86.

The control process of the normal dehumidifying-heating mode performed at step S86 is similar to the control process of the normal dehumidifying-heating mode of the above-described first embodiment. Thus, descriptions of the normal dehumidifying-heating mode are omitted.

Figure 13:
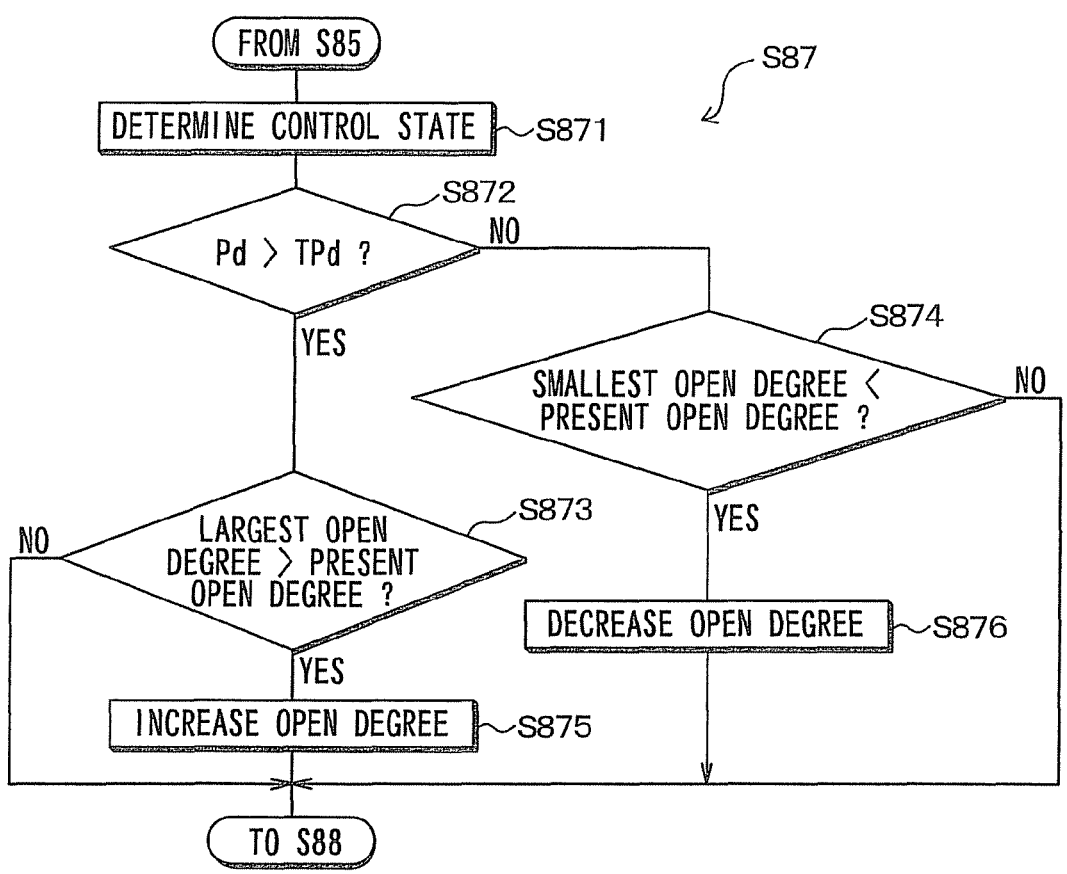
FIG. 13 is a flowchart showing a part of the control process of the vehicle air conditioner in the injection dehumidifying-heating mode, according to the first embodiment.

The control process of the bypass dehumidifying-heating mode performed at step S89 is similar to the control process of the injection dehumidifying-heating mode shown by the flowchart of FIG. 13. Hence, details of the control process of the bypass dehumidifying-heating mode will be described with reference to the flowchart of FIG. 13.

At step S871, control states of the first and second expansion valves 13, 22, the variable open-close valve 16d and the second and third open-close valves 16b, 16c in the bypass dehumidifying-heating mode are determined.

Specifically, the open degree of the first expansion valve 13 is adjusted as the same as that in the fourth dehumidifying-heating mode, and the second expansion valve 22 is fully open. The variable open-close valve 16d is open, and the second and third open-close valves 16b, 16c are closed.

Figure 16:
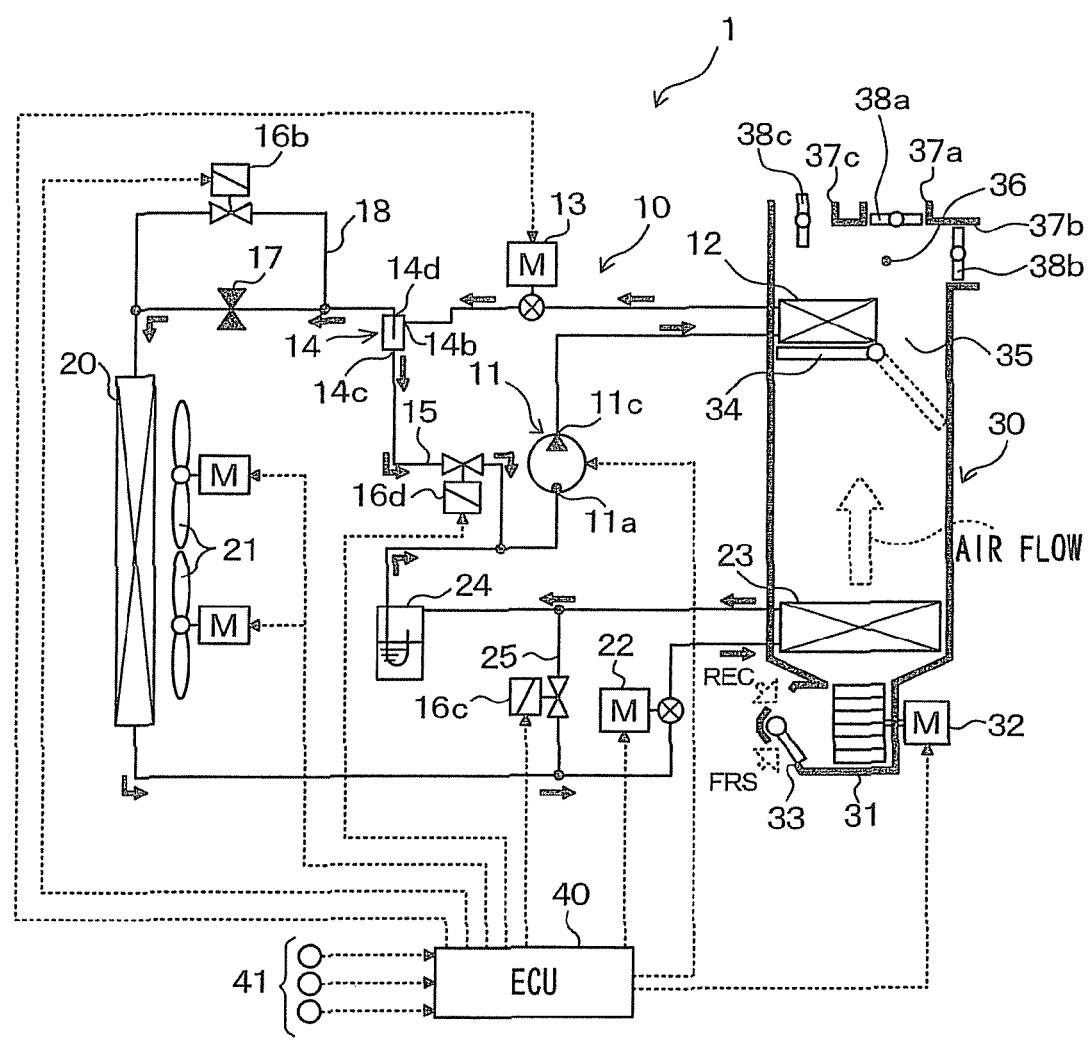
FIG. 16 is a schematic diagram showing a refrigerant circuit of a heat pump cycle for a vehicle air conditioner in a bypass dehumidifying-heating mode, according to a second embodiment of the present disclosure.

Therefore, when the air conditioning controller 40 outputs control signals and control voltages at step S12 shown in FIG. 5, the refrigerant circuit of the heat pump cycle 10 shown by solid arrows in FIG. 16 is provided.

At step S872, the air conditioning controller 40 determines whether a present higher-pressure side refrigerant pressure Pd is higher than the target pressure TPd or not. When the present higher-pressure side refrigerant pressure Pd is higher than the target pressure TPd, a control operation of step S873 is performed. When the present higher-pressure side refrigerant pressure Pd is not higher than the target pressure TPd, a control operation of step S874 is performed.

At step S873, the air conditioning controller 40 determines whether a present open degree of the first expansion valve 13 is smaller than a largest open degree or not, i.e., whether the first expansion valve 13 is fully open or not. When the present open degree of the first expansion valve 13 is smaller than the largest open degree, a control operation of step S875 is performed. At step S875, the present open degree of the first expansion valve 13 is increased by a predetermined degree, and then the control operation of step S88 is performed. On the other hand, at step S873, when the present open degree of the first expansion valve 13 is not smaller than the largest open degree, i.e., when the present open degree is equal to the largest open degree, the open degree of the first expansion valve 13 cannot be increased any more. Thus, the present open degree is maintained, and then the control operation of step S88 is performed.

At step S874, the air conditioning controller 40 determines whether a present open degree of the first expansion valve 13 is larger than a smallest open degree or not. When the present open degree of the first expansion valve 13 is larger than the smallest open degree, a control operation of step S876 is performed. At step S876, the present open degree of the first expansion valve 13 is decreased by a predetermined degree, and then the control operation of step S88 is performed.

The smallest open degree at step S874 is a smallest valve open degree within a possible range of a cross-sectional diameter of the first expansion valve 13, and the smallest open degree is thereby equal to ϕ0.5 mm in the cross-sectional diameter in the present embodiment. When the open degree of the first expansion valve 13 is the smallest open degree, the pressure reducing amount of refrigerant in the first expansion valve 13 becomes largest. The structure of the second expansion valve 22 is the same as the first expansion valve 13.

At step S874, when the present open degree of the first expansion valve 13 is not larger than the smallest open degree, i.e., when the present open degree is equal to the smallest open degree, the present open degree cannot be decreased any more. Thus, the present open degree is maintained, and then the control operation of step S88 is performed.

Figure 18:
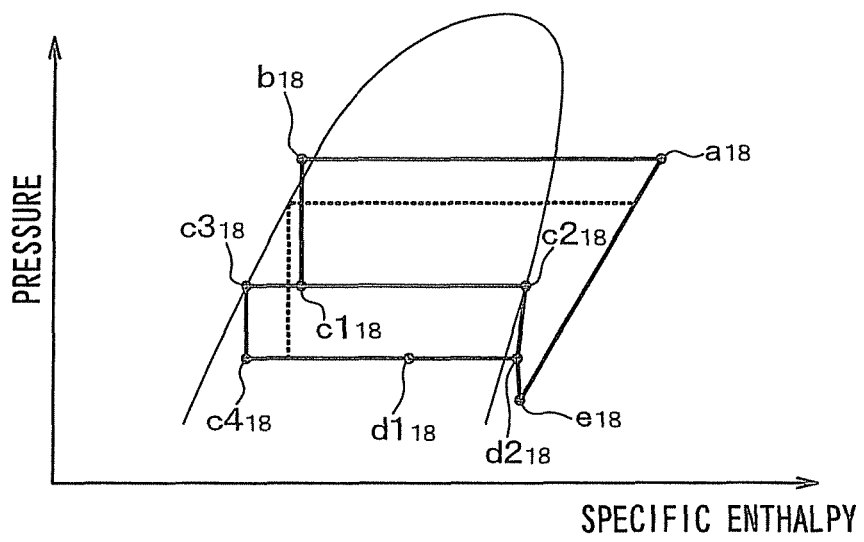
FIG. 18 is a Mollier diagram showing a refrigerant state in the heat pump cycle in the bypass dehumidifying-heating mode according to the second embodiment.

A state of refrigerant flowing in the heat pump cycle 10 in the bypass dehumidifying-heating mode changes as shown by a thick solid line in FIG. 18. In FIG. 18, the state change of refrigerant in the bypass dehumidifying-heating mode is shown by the thick solid line, and the state change of refrigerant in the fourth dehumidifying-heating mode is shown by the dashed line for comparison.

In the bypass dehumidifying-heating mode, high pressure refrigerant, discharged from the discharge port $11c$ of the compressor 11 and shown by a point $a_{18}$ in FIG. 18, flows into the interior condenser 12. As shown by the point $a_{18} \rightarrow$ a point $b_{18}$ in FIG. 18, the refrigerant in the interior condenser 12 radiates heat through heat exchange with air which has been blown by the blower 32 and been cooled and dehumidified in the interior evaporator 23. Accordingly, the air to be blown into the vehicle compartment is heated.

The high pressure refrigerant flowing out of the interior condenser 12 changes into intermediate pressure refrigerant through isenthalpic decompression and expansion in the first expansion valve 13, as shown by the point $b_{18} \rightarrow$ a point $c1_{18}$ in FIG. 18. The intermediate pressure refrigerant having been decompressed in the first expansion valve 13 is separated into gas refrigerant and liquid refrigerant in the gas-liquid separator 14 as shown by the point $c1_{18} \rightarrow$ a point $c2_{18}$, and by the point $c1_{18} \rightarrow$ a point $c3_{18}$ in FIG. 18.

The gas refrigerant flowing out of the gas-liquid separator 14 flows into the suction port $11a$ of the compressor 11 via the intermediate pressure passage 15 because the variable open-close valve $16d$ is open. At this time, the gas refrigerant is decompressed by the variable open-close valve $16d$ as shown by the point $c2_{18} \rightarrow$ a point $d2_{18}$ in FIG. 18.

The liquid refrigerant flowing out of the gas-liquid separator 14 flows into the fixed throttle 17 because the second open-close valve 16 is closed. And then, the liquid refrigerant changes into low pressure refrigerant through isenthalpic decompression and expansion in the fixed throttle 17 as shown by the point $c3_{18} \rightarrow$ a point $c4_{18}$ in FIG. 18. The refrigerant flowing out of the fixed throttle 17 flows into the exterior heat exchanger 20, thereby absorbing heat through heat exchange with outside air blown by the blower fan 21 as shown by the point $c4_{18} \rightarrow$ a point $d1_{18}$ in FIG. 18.

The third open-close valve $16c$ is closed and the second expansion valve 22 is fully open, and thus, the refrigerant flowing out of the exterior heat exchanger 20 flows into the interior radiator 23 without being decompressed. Then, the refrigerant absorbs heat from air blown by the blower 32 and evaporates, as shown by the point $d1_{18} \rightarrow$ a point $d2_{18}$ in FIG. 18. Accordingly, the air to be blown into the vehicle compartment is cooled.

The refrigerant flowing out of the interior radiator 23 flows into the accumulator 24 to be separated into gas refrigerant and liquid refrigerant. The gas refrigerant flowing out of the accumulator 24 is drawn into the suction port $11a$ of the compressor 11, and is compressed as shown by a point $e_{18} \rightarrow$ the point $a_{18}$ in FIG. 18.

As described above, in the bypass dehumidifying-heating mode, air having cooled and dehumidified in the interior evaporator 23 can be heated in the interior condenser 12 and can be blown into the vehicle compartment, so that the dehumidifying-heating of the vehicle compartment can be performed.

In the bypass dehumidifying-heating mode, intermediate pressure refrigerant in the heat pump cycle 10 can be drawn into the compressor 11 from the suction port $11a$, so that a gas bypass cycle can be provided. Accordingly, in the bypass dehumidifying-heating mode, a refrigerant amount drawn into the compressor 11 can be increased, and a temperature of high-temperature and high-pressure refrigerant discharged from the discharge port $11c$ of the compressor 11 can be increased more than in the fourth dehumidifying-heating mode. As a result, a compression work amount in the compressor 11 can be increased, and the air heating capacity of the interior condenser 12 can be thereby increased sufficiently.

In the Mollier diagram of FIG. 18, in the bypass dehumidifying-heating mode, it is shown that the temperature of high-temperature and high-pressure refrigerant discharged from the compressor 11 is increased more than in the fourth dehumidifying-heating mode. However, based on a study of the inventor, even though the temperature of the high-temperature and high-pressure refrigerant discharged from the compressor 11 in the bypass dehumidifying-heating mode is not higher than that in the fourth dehumidifying-heating mode, the air heating capacity of the interior condenser 12 can be improved sufficiently due to the increase of the compression work amount in the compressor 11.

Furthermore, in the bypass dehumidifying-heating mode, the open degree of the first expansion valve 13 is increased in accordance with increase of the target pressure TPd, i.e., with increase of the target outlet temperature TAO of air to be blown into the vehicle compartment, as in the above description of steps S873→S875. Accordingly, a quality of refrigerant flowing into the gas-liquid separator 14 can be increased in accordance with the increase of the target outlet temperature TAO. Hence, a refrigerant amount (gas bypass amount) flowing into the suction port $11a$ can be increased, and the compression work amount in the higher-stage compression mechanism can be thereby increased. As a result, the air heating capacity of the interior condenser 12 can be improved sufficiently and properly.

When the refrigerant amount (gas bypass amount) flowing into the suction port $11a$ is increased, a refrigerant amount (liquid refrigerant amount) flowing into the exterior heat exchanger 20 and the interior evaporator 23 is decreased. However, a temperature of the interior evaporator 23 is increased due to the decrease of the refrigerant amount flowing thereinto, and the rotation rate Nc of the compressor 11 is thereby increased by the above-described feedback control. Accordingly, an appropriate amount of refrigerant flows into the exterior heat exchanger 20 and the interior evaporator 23. Moreover, because the refrigerant amount (gas bypass amount) flowing into the suction port $11a$ CaO be further increased by the increase of the rotation rate Nc of the compressor 11, the air heating capacity of the interior condenser 12 can be further improved.

A pressure of gas refrigerant having been decompressed by the variable open-close valve $16d$ may be higher than a pressure of gas refrigerant having passed through gas-liquid separation in the accumulator 24. Thus, when the rotation rate Nc of the compressor 11 is increased, the gas refrigerant having been decompressed by the variable open-close valve 16d flows more easily into the suction port 11a than the gas refrigerant having passed through the gas-liquid separation in the accumulator 24. As a result, the gas bypass amount can be increased effectively. Additionally, a difference between the pressure of gas refrigerant having been decompressed by the variable open-close valve 16d and the pressure of the gas refrigerant having passed through the gas-liquid separation in the accumulator 24 may be kept properly so as to prevent the gas refrigerant having decompressed by the variable open-close valve 16d from flowing back to the accumulator 24.

Next, a heating mode performed at step S9 of the present embodiment will be described. As shown in FIG. 19, in the heating mode, the variable open-close valve 16d is closed, and the open degree of the first expansion valve 13 is reduced to decompress refrigerant. The second expansion valve 22 is closed, and the control state of the servomotor of the air mix door 34 is determined such that the open degree of the air mix door 34 is made to be a smallest degree to close the bypass air passage 35. The second open-close valve 16b is closed, and the third open-close valve 16c is open.

Figure 19:
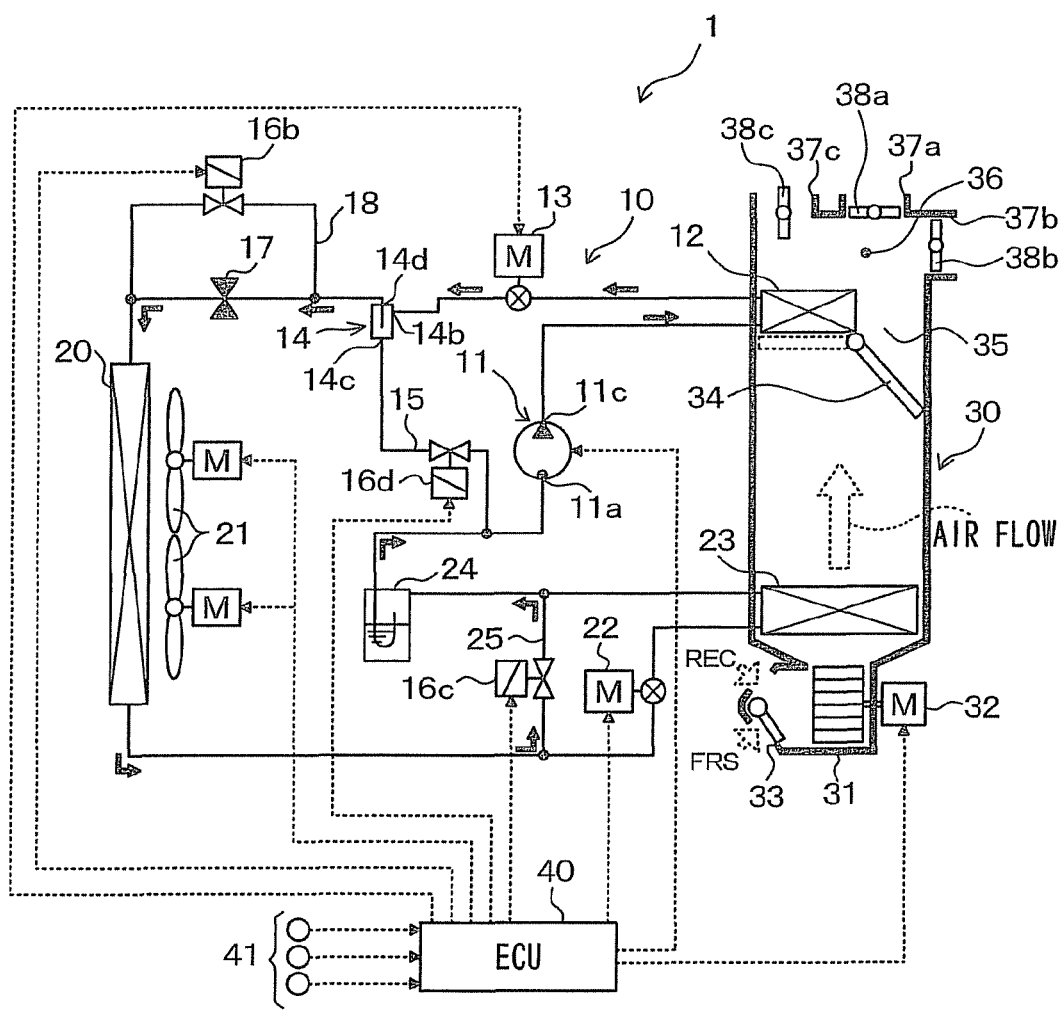
FIG. 19 is a schematic diagram showing a refrigerant circuit of the heat pump cycle for the vehicle air conditioner in a heating mode, according to the second embodiment.

Thus, when the air conditioning controller 40 outputs control signals and control voltages to the controlled air conditioning components, the refrigerant circuit of the heat pump cycle 10 shown by solid arrows in FIG. 19 is provided.

The rotation rate Nc of the compressor 11 is determined such that the higher-pressure side refrigerant pressure Pd between the discharge port 11c of the compressor 11 and the inlet side of the first expansion valve 13 in the heat pump cycle 10 approaches the target pressure TPd by a feedback control or the like. The target pressure TPd is determined based on the target outlet temperature TAO by using a control map stored in the air conditioning controller 40 so that a temperature of the air blown into the vehicle compartment becomes the target outlet temperature TAO.

In the heat pump cycle 10 in the heating mode, high pressure refrigerant discharged from the discharge port 11c of the compressor 11 flows into the interior condenser 12. The refrigerant flowing into the interior condenser 12 radiates heat through heat exchange with air having been blown by the blower 32 and been passed through the interior radiator 23. Accordingly, the air to be blown into the vehicle compartment is heated.

The refrigerant flowing out of the interior condenser 12 changes into intermediate pressure refrigerant through isenthalpic decompression and expansion in the first expansion valve 13 which is in a decompression state. The intermediate pressure refrigerant having been decompressed in the first expansion valve 13 flows through the gas-liquid separator 14 into the fixed throttle 17, and changes into low pressure refrigerant through isenthalpic decompression and expansion in the fixed throttle 17, because the variable open-close valve 16d and the second open-close valve 16b are closed. The refrigerant flowing out of the fixed throttle 17 flows into the exterior heat exchanger 20, and absorbs heat through heat exchange with outside air blown by the blower fan 21.

The refrigerant flowing out of the exterior heat exchanger 20 flows into the accumulator 24 via the bypass passage 25 to be separated into gas refrigerant and liquid refrigerant, because the third open-close valve 16c is open. Subsequently, the gas refrigerant obtained through gas-liquid separation in the accumulator 24 is drawn into the compressor 11 from the suction port 118 to be compressed. On the other hand, the liquid refrigerant obtained through the gas-liquid separation in the accumulator 24 is stored in the accumulator 24 as surplus refrigerant which is unnecessary for providing required refrigeration capacity of the heat pump cycle 10.

As described above, in the heating mode, the compressor 11 discharges refrigerant into the interior condenser 12, and then the discharged refrigerant radiates heat to air blown toward the vehicle compartment. Accordingly, heated air can be blown into the vehicle compartment, and heating of the vehicle compartment can be thereby performed.

Third Embodiment

Figure 20:
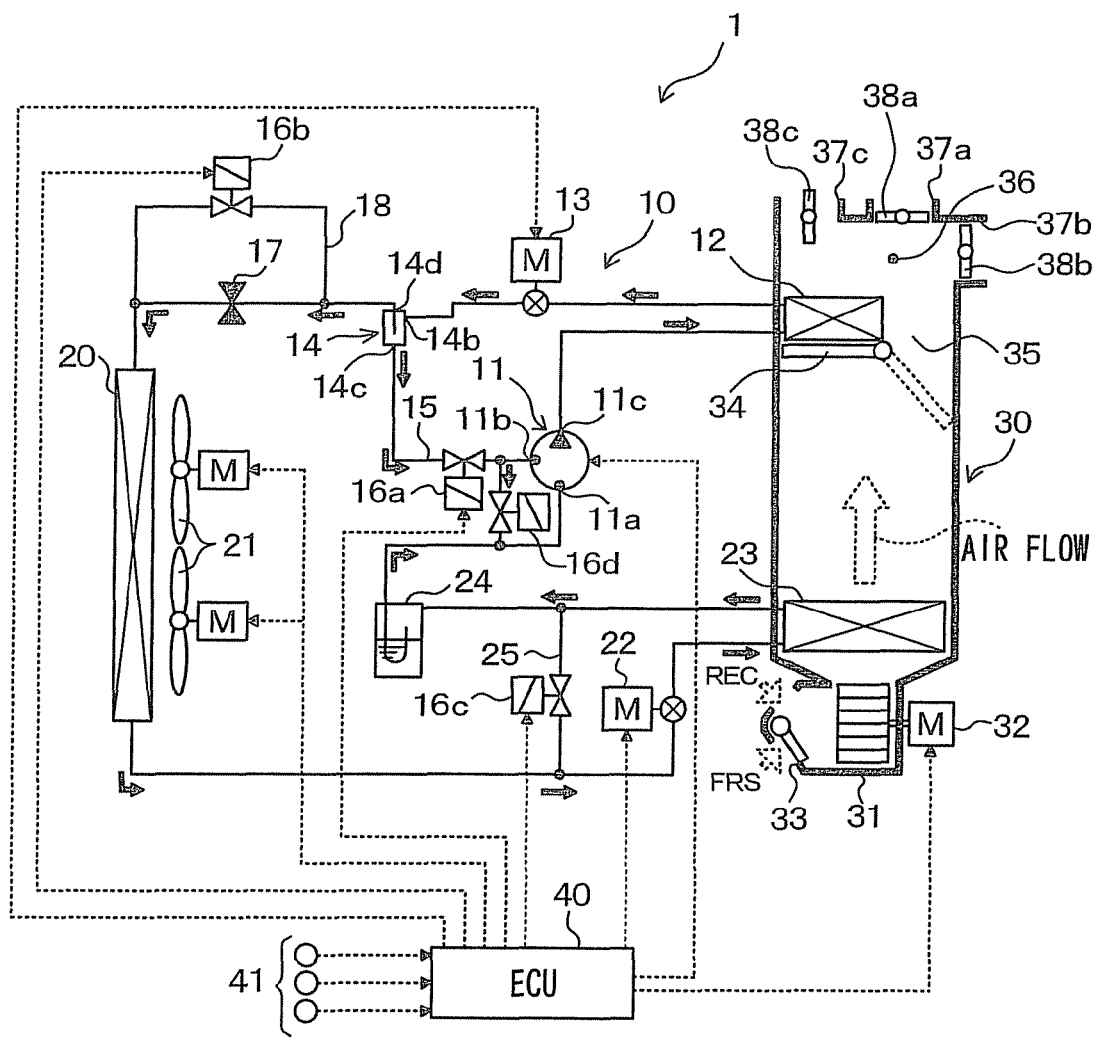
FIG. 20 is a schematic diagram showing a refrigerant circuit of a heat pump cycle for a vehicle air conditioner in a bypass dehumidifying-heating mode, according to a third embodiment of the present disclosure.

In the above-described first embodiment, the gas outflow port 14c of the gas-liquid separator 14 is connected to the intermediate pressure port 11b of the compressor 11 via the intermediate pressure passage 15. In a third embodiment, as shown in FIG. 20, an intermediate pressure passage 15 is branched into two passages. One of the two passages is connected to the intermediate pressure port 11b of the compressor 11, and the other one of the two passages is connected to the suction port 11a of the compressor 11. Thus, the gas outflow port 14c of the gas-liquid separator 14 is connected to the intermediate pressure port 11b and the suction port 11a of the compressor 11 via the intermediate pressure passage 15.

In the present embodiment, the first open-close valve 16a is disposed upstream of the branching point in the intermediate pressure passage 15, and the variable open-close valve 16d is arranged downstream of the branching point in the passage of the intermediate pressure passage 15 connected to the suction port 11a of the compressor 11. Details of the variable open-close valve 16d are described in the second embodiment, thereby being omitted.

When the first open-close valve 16a is closed, the cooling mode or the normal dehumidifying-heating mode described in the first embodiment can be performed.

When the first open-close valve 16a is open, and when the variable open-close valve 16d is closed, the injection dehumidifying-heating mode or the heating mode described in the first embodiment can be performed.

When both the first open-close valve 16a and the variable open-close valve 16d are open, the bypass dehumidifying-heating mode described in the second embodiment can be performed.

Although the present disclosure has been fully described in connection with the preferred embodiments thereof with reference to the accompanying drawings, it is to be noted that various changes and modifications will become apparent to those skilled in the art. That is, the present disclosure is not limited to the above-described embodiments, and can be modified variously as follows without departing from the scope of the present disclosure.

(1) In the above-described embodiments, the refrigerant cycle device of the present disclosure is used for the vehicle air conditioner 1 of the electric vehicle, but the refrigerant cycle device of the present disclosure may be suitably used for a vehicle, in which waste heat of an engine is insufficient to be used as a heat source for heating a vehicle compartment of the vehicle. For example, the refrigerant cycle device may be used for a hybrid vehicle driven by an internal combustion engine and an electrical motor. Additionally, the refrigerant cycle device of the present disclosure may be used for a stationary air conditioner or the like.

In the above-described embodiments, the refrigerant cycle device can perform the variety of air conditioning modes by switching its refrigerant circuit. However, an effect of the present disclosure on improvement of the air heating capacity of the heating heat exchanger can be obtained at least in a refrigerant cycle in which a normal refrigerant cycle can be switched to a gas injection cycle (economizer refrigerant cycle) or to a gas bypass cycle. Thus, such refrigerant cycle may be used as the refrigerant cycle device of the present embodiment.

(2) In the above-described embodiments, at step S6 shown in FIG. 5, the air conditioning mode is determined to be one of the cooling mode, the dehumidifying-heating mode and the heating mode by operating the mode selecting switch, but the determination of the air conditioning mode is not limited to this.

For example, when a preset temperature inside the vehicle compartment is lower than an outside temperature, the cooling mode may be determined to be performed. When the preset temperature is higher than the outside temperature, the heating mode may be determined to be performed. Moreover, a humidity detection portion which detects a humidity in the vehicle compartment may be provided. In this case, when the humidity in the vehicle compartment is equal to or higher than a predetermined humidity, the dehumidifying-heating mode may be determined to be performed.

(3) In the above-described first and third embodiments, the first open-close valve 16a, which is made from an electromagnetic valve, is adopted as an example of the open-close portion, but the open-close portion is not limited to the first open-close valve 16a. For example, a flow rate adjusting valve, which can be fully closed, may be adopted as the open-close portion. Then, in the injection dehumidifying-heating mode, an open degree of the flow rate adjusting valve may be increased in accordance with increase of the target outlet temperature TAO which is a target temperature of air to be blown into the vehicle compartment.

(4) In the above-described first and third embodiments, when the heating mode is selected as the air conditioning mode, the whole heat pump cycle 10 has the gas injection cycle configuration, but the cycle configuration in the heating mode is not limited to this. For example, when a required air heating capacity is equal to or lower than a predetermined value, a following valve condition may be provided. The open degree of the first expansion valve 13 is reduced, and the second expansion valve 22 is fully closed. The first open-close valve 16a is closed, and the second and third open-close valve 16b, 16c are open.

Accordingly, a refrigerant cycle can be provided, in which refrigerant flows through, in an order, the discharge port 11c of the compressor 11→the interior condenser 12→the first expansion valve 13→the exterior heat exchanger 20→the accumulator 24→the suction port 11a of the compressor 11. Thus, when the required air heating capacity is equal to or lower than the predetermined value, the rotation number Nc of the compressor 11 can be increased, and decrease of compression efficiency of the compressor 11 can be limited.

(5) In the above-described embodiment, the quality X of refrigerant flowing into the exterior heat exchanger 20 is set to be equal to or lower than 0.1 in the heating mode by setting a flow characteristic of the fixed throttle 17 used as an example of the lower stage expansion device (second expansion device). However, the lower stage expansion device (17) is not limited to the fixed throttle.

A variable throttle mechanism having a similar configuration to the first expansion valve 13 may be adopted as the lower stage expansion device (17). In this case, the quality X of refrigerant flowing into the exterior heat exchanger 20 may be calculated based on a temperature and a pressure of the refrigerant flowing into the exterior heat exchanger 20, and the air conditioning controller 40 may control an open degree of the variable throttle mechanism adopted as the lower stage expansion device, such that the calculated quality X of the refrigerant flowing into the exterior heat exchanger 20 becomes equal to or lower than 0.1.

(6) In the above-described embodiments, in the normal dehumidifying-heating mode, the air conditioning mode is switched in a stepwise manner from the first dehumidifying-heating mode to the fourth dehumidifying-heating mode in accordance with increase of the target outlet temperature TAO, but the switching manner from the first to fourth dehumidifying-heating modes is not limited to the stepwise manner. For example, the switching from the first to fourth dehumidifying-heating modes may be performed continuously in accordance with the increase of the target outlet temperature TAO.

That is, the open degree of the first expansion valve 13 may be reduced, and the open degree of the second expansion valve 22 may be increased, in accordance with the increase of the target outlet temperature TAO. By the changes of the open degrees of the first and second expansion valve 13, 22, a pressure (temperature) of refrigerant in the exterior heat exchanger 20 is adjusted. Accordingly, the exterior heat exchanger 20 can be switched automatically from in a state used as a radiator to in a state used as an evaporator.

The injection dehumidifying-heating mode or the bypass dehumidifying-heating mode may be selected as the air conditioning mode when the pressure reducing amount of refrigerant in the first expansion valve 13 is largest in the fourth dehumidifying-heating mode, and when the pressure reducing amount of refrigerant in the second expansion valve 22 is smallest in the fourth dehumidifying-heating mode. Alternatively, the injection dehumidifying-heating mode or the bypass dehumidifying-heating mode may be selected as the air conditioning mode when the pressure reducing amount of refrigerant in the first expansion valve 13 is higher than a predetermined value in the fourth dehumidifying-heating mode, and when the pressure reducing amount of refrigerant in the second expansion valve 22 is lower than a predetermined value in the fourth dehumidifying-heating mode.

Additional advantages and modifications will readily occur to those skilled in the art. The disclosure in its broader terms is therefore not limited to the specific details, representative apparatus, and illustrative examples shown and described.

What is claimed is:

1. A heat pump cycle comprising:
   a compressor configured to compress refrigerant, the compressor having a suction port through which refrigerant is drawn to be compressed, and a discharge port from which the compressed refrigerant is discharged;
   a heating heat exchanger configured to heat air, which is blown toward an air-conditioning target space, by heat exchange with the refrigerant discharged from the discharge port of the compressor;
   a first expansion device configured to decompress the refrigerant flowing out of the heating heat exchanger;
   a gas-liquid separation portion configured to separate the refrigerant flowing out of the first expansion device into gas refrigerant and liquid refrigerant;
   a second expansion device configured to decompress the liquid refrigerant separated in the gas-liquid separation portion;
   an exterior heat exchanger in which the refrigerant flowing out of the second expansion device exchanges heat with outside air;
   a third expansion device configured to decompress the refrigerant flowing out of the exterior heat exchanger;

a cooling heat exchanger arranged upstream of the heating heat exchanger in a flow direction of the blown air, the cooling heat exchanger being configured to cool the blown air by heat exchange between the blown air and the refrigerant flowing out of the third expansion device and to let the refrigerant flow to the suction port;

an intermediate pressure passage configured to guide the gas refrigerant from the gas-liquid separation portion to the suction port;

an open-close portion configured to open or close the intermediate pressure passage; and a fourth expansion device configured to decompress the gas refrigerant flowing in the intermediate pressure passage, wherein the open-close portion and the fourth expansion device are provided to select a bypass dehumidifying-heating mode as a dehumidifying-heating mode in which the blown air having been cooled in the cooling heat exchanger is heated in the heating heat exchanger to be equal to or higher than air in the air-conditioning target space in temperature, and the open-close valve opens the intermediate pressure passage such that the gas refrigerant flowing out of the gas-liquid separation portion is decompressed by the fourth expansion device and is introduced into the suction port of the compressor, in the bypass dehumidifying-heating mode.

2. The heat pump cycle according to claim 1, wherein
the open-close portion closes the intermediate pressure passage such that the refrigerant flowing out of the first expansion device flows totally to the second expansion device when a normal dehumidifying-heating mode is selected as the dehumidifying-heating mode.

3. The heat pump cycle according to claim 1, wherein
the refrigerant flowing to the suction port through the intermediate pressure passage is increased in flow amount in accordance with increase of a target temperature of the blown air in the bypass dehumidifying-heating mode.

4. The heat pump cycle according to claim 3, wherein
a throttle open degree of the first expansion device is increased in accordance with the increase of the target temperature of the blown air, in the bypass dehumidifying-heating mode.

5. The heat pump cycle according to claim 2, wherein
the first expansion device increases a pressure reducing amount of refrigerant, and the third expansion device decreases a pressure reducing amount of refrigerant, in accordance with increase of a target temperature of the blown air, in the normal dehumidifying-heating mode.

6. The heat pump cycle according to claim 5, wherein
the bypass dehumidifying-heating mode is selected when the pressure reducing amount of refrigerant in the third expansion device is a smallest amount.

7. The heat pump cycle according to claim 5, wherein
the bypass dehumidifying-heating mode is selected when the pressure reducing amount of refrigerant in the third expansion device is lower than a predetermined value.

8. The heat pump cycle according to claim 1, further comprising
a refrigerant circuit switching portion configured to switch a flow passage of the refrigerant, wherein
the open-close portion closes the intermediate pressure passage, and the refrigerant circuit switching portion causes the refrigerant flowing out of the heating heat exchanger to flow through, in this order, the first expansion device, the gas-liquid separation portion, the exterior heat exchanger, the third expansion device and the cooling heat exchanger, when a cooling mode, in which the blown air is cooled to be lower than the air in the air-conditioning target space in temperature, is selected instead of the dehumidifying-heating mode.

9. The heat pump cycle according to claim 1, wherein
the open-close portion closes the intermediate pressure passage, and the refrigerant circuit switching portion causes the refrigerant flowing out of the heating heat exchanger to flow through, in this order, the first expansion device, the gas-liquid separation portion, the second expansion device and the exterior heat exchanger without passing through the third expansion device and the cooling heat exchanger, when a heating mode, in which the blown air is heated to be equal to or higher than the air in the air-conditioning target space in temperature, is selected instead of the dehumidifying-heating mode or the cooling mode.

10. The heat pump cycle according to claim 1, wherein
the open-close portion and the fourth expansion device are integrated into a single unit.

11. A heat pump cycle comprising:
a compressor configured to compress refrigerant, the compressor having a suction port through which refrigerant is drawn to be compressed, a discharge port from which the compressed refrigerant is discharged, and an intermediate pressure port through which refrigerant is drawn to be compressed;

a heating heat exchanger configured to heat air, which is blown toward an air-conditioning target space, by heat exchange with the refrigerant discharged from the discharge port of the compressor;

a first expansion device configured to decompress the refrigerant flowing out of the heating heat exchanger;

a gas-liquid separation portion configured to separate the refrigerant flowing out of the first expansion device into gas refrigerant and liquid refrigerant;

a second expansion device configured to decompress the liquid refrigerant separated in the gas-liquid separation portion;

an exterior heat exchanger in which the refrigerant flowing out of the second expansion device exchanges heat with outside air;

a third expansion device configured to decompress the refrigerant flowing out of the exterior heat exchanger;

a cooling heat exchanger arranged upstream of the heating heat exchanger in a flow direction of the blown air, the cooling heat exchanger being configured to cool the blown air by heat exchange between the blown air and the refrigerant flowing out of the third expansion device and to let the refrigerant flow to the suction port;

an intermediate pressure passage configured to guide the gas refrigerant from the gas-liquid separation portion to the intermediate pressure port; and an open-close portion configured to open or close the intermediate pressure passage, wherein
the open-close portion is provided to select an injection dehumidifying-heating mode as a dehumidifying-heating mode in which the blown air having been cooled in the cooling heat exchanger is heated in the heating heat exchanger to be equal to or higher than air in the air-conditioning target space in temperature, and
the open-close valve opens the intermediate pressure passage such that the gas refrigerant flowing out of the gas-liquid separation portion is introduced into the intermediate pressure port of the compressor, in the injection dehumidifying-heating mode.

12. The heat pump cycle according to claim 11, wherein the open-close portion closes the intermediate pressure passage such that the refrigerant flowing out of the first expansion device flows totally to the second expansion device when a normal dehumidifying-heating mode is selected as the dehumidifying-heating mode.

13. The heat pump cycle according to claim 11, wherein the refrigerant flowing to the intermediate pressure port through the intermediate pressure passage is increased in flow amount in accordance with increase of a target temperature of the blown air, in the injection dehumidifying-heating mode.

14. The heat pump cycle according to claim 13, wherein a throttle open degree of the first expansion device is increased in accordance with the increase of the target temperature of the blown air, in the injection dehumidifying-heating mode.

15. The heat pump cycle according to claim 12, wherein the first expansion device increases a pressure reducing amount of refrigerant, and the third expansion device decreases a pressure reducing amount of refrigerant, in accordance with increase of a target temperature of the blown air, in the normal dehumidifying-heating mode.

16. The heat pump cycle according to claim 15, wherein the injection dehumidifying-heating mode is selected when the pressure reducing amount of refrigerant in the third expansion device is a smallest amount.

17. The heat pump cycle according to claim 15, wherein the injection dehumidifying-heating mode is selected when the pressure reducing amount of refrigerant in the third expansion device is lower than a predetermined value.

18. The heat pump cycle according to claim 11, further comprising a refrigerant circuit switching portion configured to switch a flow passage of the refrigerant, wherein the open-close portion closes the intermediate pressure passage, and the refrigerant circuit switching portion causes the refrigerant flowing out of the heating heat exchanger to flow through, in this order, the first expansion device, the gas-liquid separation portion, the exterior heat exchanger, the third expansion device and the cooling heat exchanger, when a cooling mode, in which the blown air is cooled to be lower than the air in the air-conditioning target space in temperature, is selected instead of the dehumidifying-heating mode.

19. The heat pump cycle according to claim 11, wherein the open-close portion closes the intermediate pressure passage, and the refrigerant circuit switching portion causes the refrigerant flowing out of the heating heat exchanger to flow through, in this order, the first expansion device, the gas-liquid separation portion, the second expansion device and the exterior heat exchanger without passing through the third expansion device and the cooling heat exchanger, when a heating mode, in which the blown air is heated to be equal to or higher than the air of the air-conditioning target space in temperature, is selected instead of the dehumidifying-heating mode or the cooling mode.

\* \* \* \* \*